US005590225A

United States Patent [19]

Aramaki et al.

[11] Patent Number: 5,590,225

[45] Date of Patent: Dec. 31, 1996

[54] PLASTIC HOLDER FOR BEARING

[75] Inventors: Teruo Aramaki, Kawakura; Magozo Hamamoto, Zama, both of Japan

[73] Assignee: Nippon Seiko Kabushiki Kaisha, Tokyo, Japan

[21] Appl. No.: 235,226

[22] Filed: Apr. 29, 1994

Related U.S. Application Data

[63] Continuation of Ser. No. 26,174, Mar. 1, 1993, abandoned, which is a continuation of Ser. No. 752,178, Aug. 23, 1991, abandoned, which is a continuation of Ser. No. 497,739, Mar. 19, 1990, abandoned, which is a continuation-in-part of Ser. No. 309,725, filed as PCT/JP88/00538, Jun. 3, 1988, abandoned.

[30] Foreign Application Priority Data

| | | | |
|---|---|---|---|
| Jun. 4, 1987 | [JP] | Japan | 62-138997 |
| Feb. 3, 1988 | [JP] | Japan | 63-021836 |

[51] Int. Cl.[6] ..... F16C 33/56

[52] U.S. Cl. ..... 384/527; 384/576; 384/911; 384/909

[58] Field of Search ..... 384/297, 300, 384/523, 907, 909, 520, 527, 572, 576, 614, 623

[56] References Cited

U.S. PATENT DOCUMENTS

| | | | |
|---|---|---|---|
| 3,882,030 | 5/1975 | Campbell et al. | 252/12 |
| 4,015,949 | 4/1977 | Baker et al. | 384/909 X |
| 4,017,555 | 4/1977 | Alvarez | 260/857 PA |
| 4,152,099 | 5/1979 | Bingher | 384/276 X |
| 4,263,695 | 4/1981 | Duncan et al. | 384/287 X |
| 4,371,445 | 2/1983 | Faigle | 252/12 |
| 4,528,335 | 7/1985 | Selby et al. | 525/420 |
| 4,544,700 | 10/1985 | Wright | 524/543 |
| 4,575,429 | 3/1986 | Jacobsen | 384/279 X |

FOREIGN PATENT DOCUMENTS

| | | |
|---|---|---|
| 53-136100 | 11/1978 | Japan . |
| 55-40306 | 3/1980 | Japan . |
| 61-7332 | 1/1986 | Japan . |
| 61-66720 | 4/1986 | Japan . |
| 61-254663 | 11/1986 | Japan . |

OTHER PUBLICATIONS

"Materials for plastics cages in rolling bearings", Ball Bearing Journal vol. 227, pp. 14–19.

*Primary Examiner*—Thomas R. Hannon
*Attorney, Agent, or Firm*—Shapiro and Shapiro

[57] ABSTRACT

A plastic holder for a rolling bearing is made of linear-chain polyphenylene sulfide resin, preferably with glass fiber reinforcement.

5 Claims, 21 Drawing Sheets

205
204
207
208
203
206
205
204
207
202
208
203
201

AFTER 250 HOURS IN OIL (MOBIL SHC 629) OF WHICH TEMPERATURE IS MAINTAINED AT 150°C
EXAMPLE A
COM. EX. C
COM. EX. D
ANNULAR TENSILE BREAKING LOAD (kgf)
GF %
0
2
4
6
8
10
20
30
40

AFTER 250 HOURS IN OVEN IN WHICH AIR TEMPERATURE IS MAINTAINED AT 190°C
EXAMPLE A
COM. EX. C
COM. EX. D
ANNULAR TENSILE BREAKING LOAD (kgf)
GF %
0
2
4
6
8
10
20
30
40

AFTER 250 HOURS IN OIL (MOBIL SHC 629) OF WHICH TEMPERATURE IS MAINTAINED AT 150°C
EXAMPLE A
COM. EX. D
ANNULAR TENSILE BREAKING ELONGATION PERCENTAGE (BASED ON INTERNAL DIAMETERS, %)
10
8
6
4
2
0
10
20
30
40
50
GF (%)

AFTER 250 HOURS IN OIL (MOBIL SHC 629) OF WHICH TEMPERATURE IS MAINTAINED AT 150°C
EXAMPLE A
COM. EX. D
ANNULAR TENSILE BREAKING LOAD (kgf)
15
10
5
0
10
20
30
40
50
GF (%)

AFTER 250 HOURS IN OIL (MOBIL SHC 629) OF WHICH TEMPERATURE IS MAINTAINED AT 150°C
EXAMPLE A
COM. EX. C
COM. EX. D
ANNULAR TENSILE ELONGATION PERCENTAGE (BASED ON INTERNAL DIAMETERS, %)
15
10
5
GF (%)
0
10
20
30
40
50

AFTER 250 HOURS IN OIL (MOBIL SHC 629) OF WHICH TEMPERATURE IS MAINTAINED AT 150°C
EXAMPLE A
COM. EX. C
COM. EX. D
ANNULAR TENSILE BREAKING LOAD (kgf)
5.0
4.0
3.0
2.0
1.0
GF (%)
0
10
20
30
40
50

EXAMPLE A
COM. EX. C
PERCENTAGE OF SUCCESS OF ROLLER ASSEMBLING (%)
100
80
60
40
20
0
0
10
20
30
40
50
GF (%)

EXAMPLE A
COM. EX. C
PERCENTAGE OF SUCCESS OF ROLLER ASSEMBLING (%)
100
80
60
40
20
0
0
10
20
30
40
50
GF (%)

EXAMPLE A
COM. EX. C
PERCENTAGE OF SUCCESS OF ROLLER ASSEMBLING (%)
100
80
60
40
20
0
GF (%)
0
10
20
30
40
50

EXAMPLE A
COM. EX. C
PERCENTAGE OF SUCCESS OF BALL ASSEMBLING (%)
100
80
60
40
20
0
GF (%)
0
10
20
30
40
50

PLASTIC HOLDER FOR BEARING

This is a continuation of application Ser. No. 08/026,174 filed Mar. 1, 1993, which is a continuation of application Ser. No. 07/752,178 filed Aug. 23, 1991, which is a continuation of application Ser. No. 07/497,739 filed Mar. 19, 1990, which is a continuation-in-part of application Ser. No. 07/309,725, filed as PCT/JP88/00538, Jun. 3, 1988, all now abandoned.

FIELD OF THE INVENTION

The present invention relates to a plastic holder for various rolling bearings to be used under harsh conditions.

More particularly it relates to such a holder made from, a composition of linear-chain polyphenylene sulfide resin having excellent resistance to heat, oil, chemicals etc.

BACKGROUND OF THE INVENTION

The rolling bearings are generally classified into ball bearings and roller bearings according to the kind of rolling members, and each group can be further classified.

Among known holders for ball bearings there are an ordinary holder shown in FIG. 1, a crown holder shown in FIG. 2, a holder for an angular bearing shown in FIG. 3, a holder for a thrust bearing (not shown) etc. Among known holders for roller bearings there are a holder for a conical roller bearing shown in FIG. 4, that for a spherical roller bearing shown in FIG. 5, that for cylindrical roller bearing shown in FIG. 6, that for a thrust bearing (not shown), that for a thrust spherical bearing (not shown) etc.

Plastic holders have heretofore been prepared with so-called engineering plastic material such as polyamide (nylon), polyacetal, polybutylene terephthalate, fluorinated resins etc. singly or in the form of a composite material reinforced with short fibers such as glass fibers or carbon fibers. Among these materials, the polyamide resin has been widely employed for the plastic holders because of satisfactory balance of the material cost and the performance, and excellent characteristics have been confirmed under medium work conditions. However, this material shows deterioration over a long period and cannot meet the market requirements under a condition of continuous use at a temperature exceeding 120° C., or under a condition of continuous or intermittent contact with oils added with extreme pressure agents, oils or chemicals such as acids.

For plastic holders for bearings to be used under a high temperature condition exceeding 150° C., there have been proposed so-called super engineering plastics such as polyethersulfone (PES), polyetherimide (PEI), polyamide-imide (PAI) or polyether-etherketone (PEEK) as reported for example in the Ball Bearing Journal, 227, 14, 1986. However, these materials have not been employed widely because they are very expensive and are still inadequate as to physical properties required for the holders such as suitable flexibility required at the molding or assembling and fatigue resistance, though they are excellent in resistances to heat and chemicals.

Polyphenylene sulfide (PPS) is relatively inexpensive and is known to be usable for the plastic holder for use under a high temperature, but it is very brittle and insufficient in mechanical properties for use in the holders. The PPS resin is known as a crystalline thermoplastic resin consisting of alternate bonding of benzene rings and sulfur atoms. In the conventional PPS resins, crosslinked or branched structures are partially introduced by a heat treatment under a high temperature or by intentional addition of a crosslinking agent or a branching agent in the course of manufacture (hereinafter called branched PPS resins). The conventional PPS resins of a high molecular weight, being generally obtained by heating PPS of relatively low molecular weight for 1–24 hours at a high temperature in air or in an oxygen-containing gas, have branched chains or crosslinked portions due to a crosslinking reaction of active terminal groups. Also the Japanese Laid-open Patent 53-136100 disclosed a method of obtaining branched PPS resins, employing a trivalent or higher-valent polyhalogenated aromatic compound as a cross-linking or branching agent. A representative example of commercial branched PPS resins is Ryton (trade name) supplied by Philips Petroleum Inc., U.S.A.

On the other hand, there are recently developed PPS resins in which the molecular chain is linearly grown to a high molecular weight in the course of polymerization (hereinafter called linear-chain PPS resins), as disclosed in the Japanese Laid-open Patents 61-7332 and 61-66720. Such linear-chain PPS resins are characterized by a tenacity which is higher than that of the branched PPS resins, since the molecular chains of the linear-chain PPS are substantially free from branched chains and can more easily entangle mutually.

For conventional molding, branched PPS resins containing branched portions or partially crosslinked portions have been principally employed. In comparison with the linear-chain PPS resins, the branched PPS resins are more brittle because of the lower tenacity. Thus, the molding form has to be limited to a certain range for the holders requiring considerably forced demolding operations thereof after molding, such as a holder for crown ball bearing, that for conical roller bearing, or that for spherical or cylindrical roller bearing with a high coverage on rollers. Also, the holders composed of the branched PPS resin are apt to show breakage of claws, pillars, rings or flanges of the holder at the assembly of the bearing. These drawbacks are all derived from the inherent lack of flexibility of the branched PPS resins, and are the principal reason why the PPS resins are not commercially employed in the manufacture of bearing holders.

DISCLOSURE OF THE INVENTION

The object of the present invention is to provide thermally resistant plastic holders usable under harsh conditions including high temperature, by employing, as the principal component of the composition, linear PPS resin in which tenacity is significantly improved in comparison with that in the conventional branched PPS resins.

The above-mentioned drawbacks are resolved according to the present invention, by manufacturing the holder for bearing with a composition in which the matrix resin is composed of linear PPS resin in which the molecular chain is linearly grown to a high molecular weight in the polymerization step.

The thermally resistant plastic holder of the present invention, made from linear PPS resin composition, is provided not only with excellent resistance to heat, oils and chemicals but also with splendid mechanical characteristics. The use of linear PPS resin as the base material provides snap fit property required for the holder, and provides a holder capable of withstanding prolonged use under harsh conditions such as high temperature, high-speed rotation or high load.

The PPS resin constituting the matrix of the composition to be employed in the bearing holder of the present invention can be suitably prepared by methods disclosed in the aforementioned Japanese Laid-open Patents 61-7332 and 61-66720. Said PPS resin is not subjected to a heat treatment at a high temperature after polymerization, and does not contain any cross-linking agent or branching agent, but shows a fused viscosity, which is used as an index of molecular weight, equal to 700 poise or higher when measured at 310° C. with a shearing speed of 200 $sec^{-1}$. Such linear PPS resin is available from Kureha Chemical Industry Co., Ltd. under a trade name "Fortron KPS". In comparison with the branched PPS resins, the linear-chain PPS resins have superior mechanical properties as explained before, and have a significantly improved tenacity because the entanglement of molecular chains is larger for a given molecular weight. Also the linear PPS resins can improve the dimensional precision of the molded articles because the contraction at molding is smaller.

The PPS resin composition of the present invention may contain arbitrary amounts of various fillers.

Examples of inorganic filler include powdered metal oxides such as powdered alumina or powdered silica; powdered carbides such as powdered silicon carbide; powdered nitrides such as powdered silicon nitride; powdered graphite; powdered carbon black; powdered molybdenum disulfide; powdered tungsten disulfide; glass fibers; potassium titanate whisker; silicon carbide fiber; and metal fibers such as aluminum, copper or iron.

Examples of organic filler include powdered phenolic resin, powdered silicone resins, aromatic polyamide (aramide) fibers and fluorinated resins.

Such fillers may be suitably added when needed, in order to increase the rigidity of the holder and to improve the dimensional precision thereof.

Glass fibers are the preferred filler for the linear-chain PPS resin composition of the present invention.

The glass fibers to be added to the linear-chain PPS resin composition for use in the holder of the present invention can be any commercially available product, and are preferably composed of short fibers having an average fiber length of 1 to 0.2 mm and an average fiber diameter of 20 to 5 μm.

The glass fibers are added in an amount of 0 to 50 wt. %, preferably 10 to 45 wt. % with repsect to the total weight of the PPS resin composition. An addition exceeding 50 wt. % greatly reduces the deformability of the material, thus rendering the forced demolding of the holder in the molding operation difficult and causing breakage of the holder at the assembly of the bearing. Also, an addition less than 10 wt. % cannot provide sufficient reinforcement for the mechanical properties and leads to an insufficient heat resistance.

However, in case of holders for the crown ball bearings and the conical roller bearing requiring higher mechanical strength, the amount of addition of glass fibers is in a range of 0 to 35 wt. %, preferably 10 to 30 wt. %, based on the result of experiments to be explained later.

The resin composition for producing the holder of the present invention does not require special techniques for mixing the components. Various components may be supplied to a fusing-mixing apparatus separately, or after preliminary mixing of each component in a mixer such as Henschel mixer or ribbon blender. Various equipment such as a single- or Twin-screw extruder, mixing rolls, a pressure kneader or a Blavendor Blastograph may be employed as the fusing-mixing apparatus.

Also, the resin composition used for producing the holder of the present invention may contain suitable amounts of stabilizer, fluidity improving agents, surface modifiers, colorants, antistatic agents, various resins, inorganic or organic fillers etc. for the purpose of work stabilization, improvement of surface properties or tenacity, roller formation or static prevention.

BRIEF DESCRIPTION OF THE DRAWINGS

FIGS. 17, 18 and 19A to 19C outline the annular tensile test, wherein FIG. 17 is a perspective view of a holder for a conical roller bearing, FIG. 18 is a perspective view of a holder for a cylindrical roller bearing, and FIGS. 19A to 19C are schematic views of the annular tensile test;

FIGS. 27 to 30 illustrate the results of roller assembling tests on holders as a function of the amount of addition of glass fibers, wherein FIG. 27 shows test results for a holder for a cylindrical roller bearing, FIG. 28 shows test results for a holder for a spherical roller bearing, FIG. 29 shows test results for a holder for a crown ball bearing; and FIG. 30 shows test results for a holder for a conical roller bearing.

DESCRIPTION OF THE PREFERRED EMBODIMENTS

The present invention will be described in detail in connection with several preferred embodiments thereof but it is to be understood that the present invention is not limited by said embodiments.

EXAMPLES 1-1, 1-2 AND COMPARATIVE EXAMPLES 1-1, 1-2, 2-1, 2-2

Conical roller bearing holders were prepared with compositions shown in Table 1 and were subjected to various tests.

Said compositions were prepared with "Fortron (trade name) KPS W 214" supplied by Kureha Chemical Industry Co., Ltd. as the straight-chain PPS resin, "Tohpren (trade name) T4" supplied by Tohpren Co., Ltd. as the branched PPS resin, "Ube Nylon (trade name) 2020U" supplied by Ube Industries, Ltd. as the thermally resistant nylon-6,6 resin, and short glass fiber "FESS-015-0413" (average fiber length 500 μm, diameter 10 μm) supplied by Fuji Fiber Glass Co., Ltd. as the glass fiber component. These components were mixed fin the compositions shown in Table 1 with a Henschel Mixer FM-10B supplied by Mitsui Miike Mfg. Co., ltd., then kneaded and extruded into pellets with a twin screw extruder Model PCM-30 manufactured by Ikegai Corp., and formed into conical roller bearing holders with an injection molding machine PROMAT 165/75 supplied by Sumitomo Heavy Industries Co., Ltd. The thus obtained holders were subjected to thermal deterioration or shelf tests in air and deterioration or shelf tests in oil.

The thermal deterioration test was conducted by standing the holder in an air-circulating thermo-regulating oven at 170° C. for a desired period up to 500 hours. On the other hand, the deterioration test in oil was conducted by dipping the holder in Mobil SHC62 (synthetic lubricating oil with high pressure agents) and standing it in a hot-air circulating oven of 150° C. for a desired period up to 500 hours.

Figure 17:
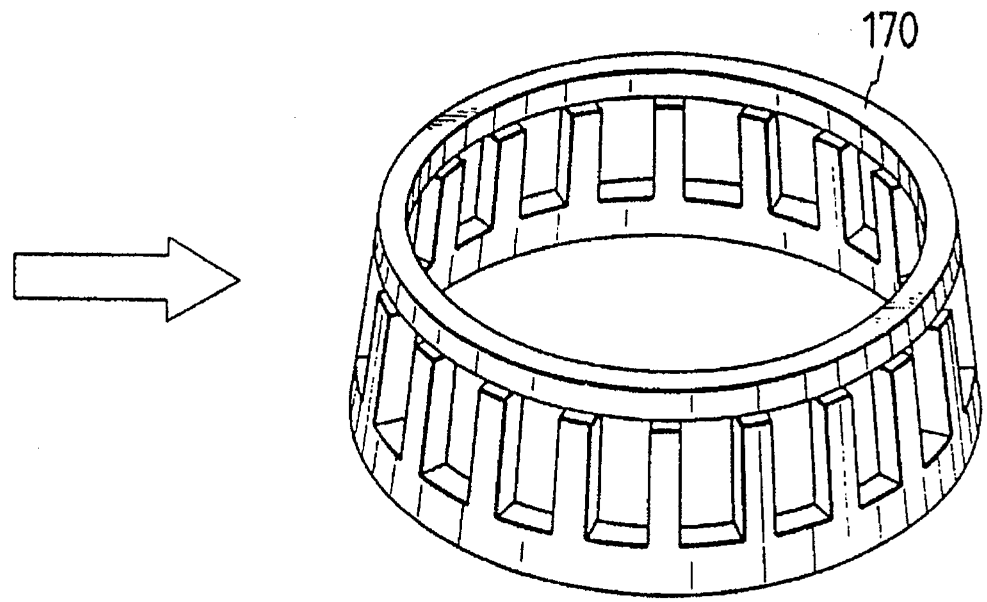
Figure 18:
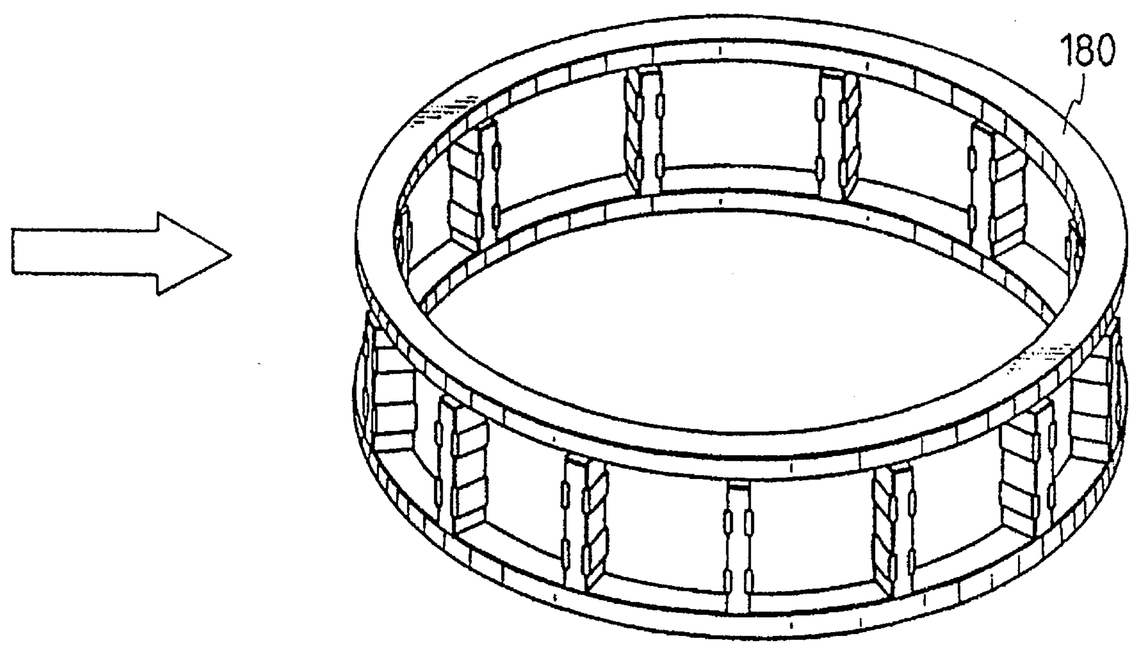

After testing, the flange portion of the smaller diameter was removed from the holder, mounted on a push-pull stand (SVH-12) manufactured by Imada Mfg. Co., ltd. in such a manner that the gate portion was placed horizontally, and was subjected to an annular tensile test with a tensile speed of 10 mm/min. to determine the breaking load and the breaking elongation (with respect to the internal diameter). Also, the rate of weight change of the holder was measured after the deterioration test. An assembly test was also conducted in order to evaluate the suitability of the holder for roller assembly operations. This test was carried out with an air-driven automatic roller assembling apparatus manufactured by Nippon Seiko Kabushiki Kaisha. FIGS. 17 to 19C illustrate the basics of the annular tensile test. The specimen used in the test is prepared from the upper annular portion of the holder. As shown in FIG. 17, a holder for a conical roller bearing is cut horizontally at the position indicated by an arrow, and the upper annular portion 170 alone is used for the test. Or, as shown in FIG. 18, a holder for a cylindrical roller bearing is cut horizontally at the position indicated by an arrow, and the upper annular portion 180 alone is likewise used in the test. The test specimen is cut out from the holder after the preparation thereof, because the strength of test specimen is strongly influenced by the flow of molten resin at the molding, so that a test specimen prepared from a production mold for the holders is most appropriate for use in the comparative strength test of the holders.

Figure 19A:
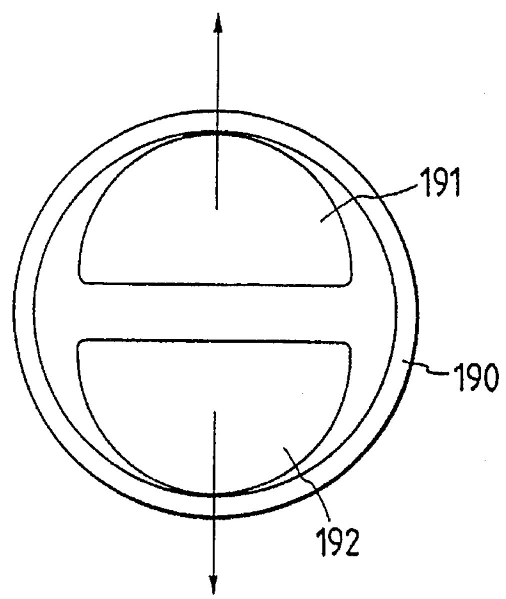
Figure 19B:
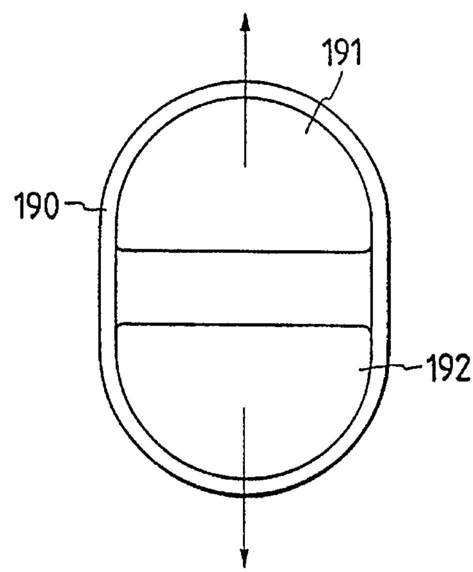
Figure 19C:
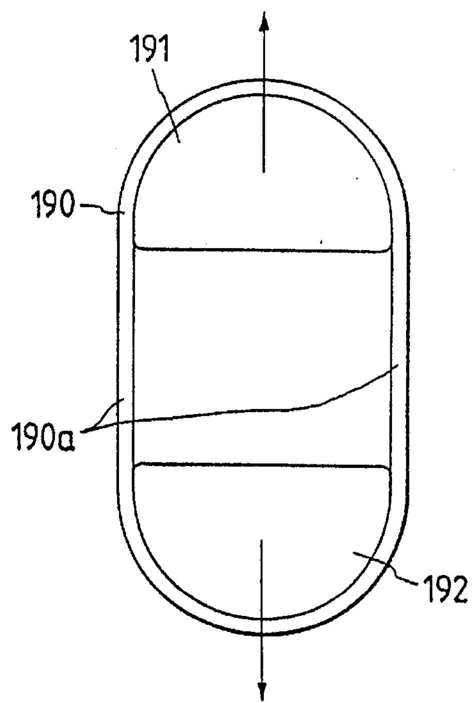

FIGS. 19A to 19C depict the annular tensile test. A test specimen 190, prepared as shown in FIG. 17 or 18, is mounted, as shown in FIG. 19, on an upper internal support 191 and a lower internal support 192 of an annular tensile tester (not shown) in such a manner that the test specimen 190 is supported without deformation by the support members 191, 192. The upper and lower internal supports 191, 192 are cylindrical members with a semicircular cross section, with a radius smaller than the internal radius of the test specimen 190. As the support members are moved, from the state shown in FIG. 19A, in mutually opposite directions (indicated by arrows) by an associated driving mechanism (not shown), the test specimen 190 starts deformation as shown in FIG. 19B, closely contacting the external periphery of the support members 191, 192. Further movement from the state in FIG. 19B causes elongation of the linear portions 190*a* of the test specimen 190 as shown in FIG. 19C, eventually causing breakage somewhere along the linear portions 190*a*. The annular tensile breaking elongation is determined by the measurement of mutual movement of the upper and lower internal supports 191, 192 from the position in FIG. 19A to the position of breakage, and the annular tensile breaking load is determined by measuring, with the earlier mentioned push-pull stand, the maximum load appearing from the state in FIG. 19A to the point of breakage. The test specimen 190 is subjected to a bending load from the state in FIG. 19A to that in FIG. 19B (bending mode), and aged or fragile resin generally shows a low tensile breaking load and tends to break in this period. Then the test specimen is subjected to a tensile load from the state in FIG. 19B to that in FIG. 19C (tensile mode), and tenacious resin tends to break in this period.

Figure 7B:
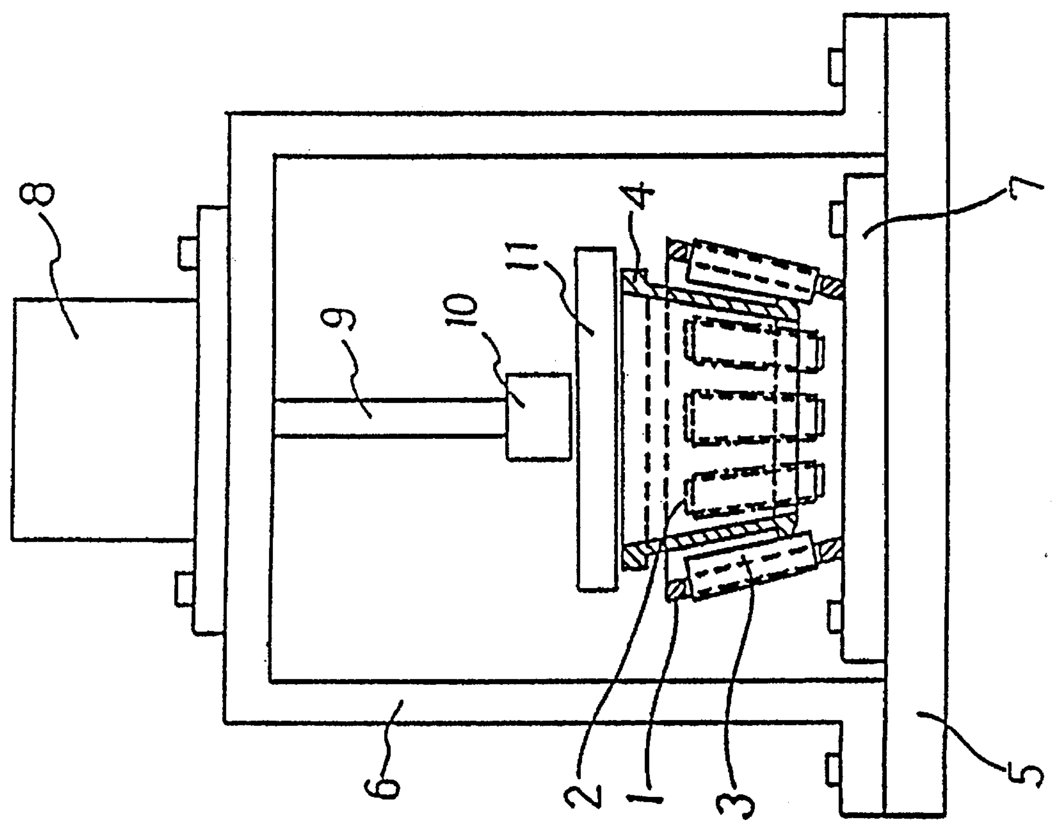
FIG. 7B is a schematic view of an air-driven automatic roller assembling apparatus.
Figure 7A:
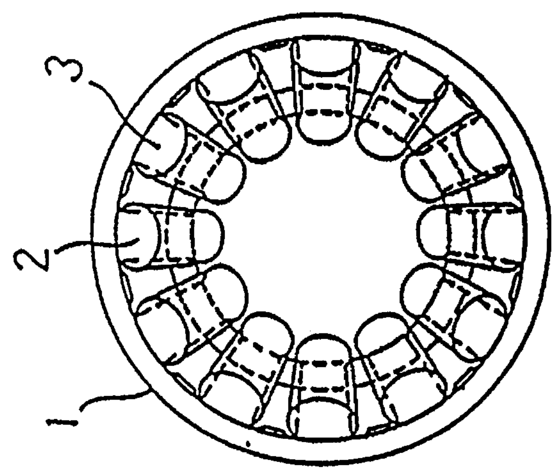
FIG. 7A is a schematic view of roller arrangement in a holder for a conical roller bearing.

The automatic roller assembling apparatus used in the roller assembly test is depicted in FIGS. 7A and 7B. This apparatus is capable of distributing rollers 3 on an internal pocket surface of the holder (FIG. 7A), then inserting an inner ring 4 and pressing the large diameter face of the inner ring with air pressure so that all the rollers are instantly lodged in corresponding pockets 2 of the holder. Referring to FIG. 7B, a frame 6 and a holder support plate 7 are fixed on a base plate 5, and a holder 1, with rollers 3 uniformly distributed on the pocket face at the internal diameter side and with the inner ring 4 placed thereon, is placed oh said holder support plate 7. Then a pushing plate 11 is placed on the larger diameter face of said inner ring 4, and a punch 10 provided at the front end of a cylinder rod 9 of an air cylinder 8 fixed to the frame 6, is pressed against said pushing plate 11 by the air pressure supplied to said cylinder 8, thereby instantly lodging all the rollers 3 into the pockets 2 of the holder 1 at the same time. The moving speed and load of said cylinder were respectively 0.2 m/sec. and 60 kgf. In FIG. 7B, the holder 1 and the inner ring 4 are shown in axial cross section.

Figure 8B:
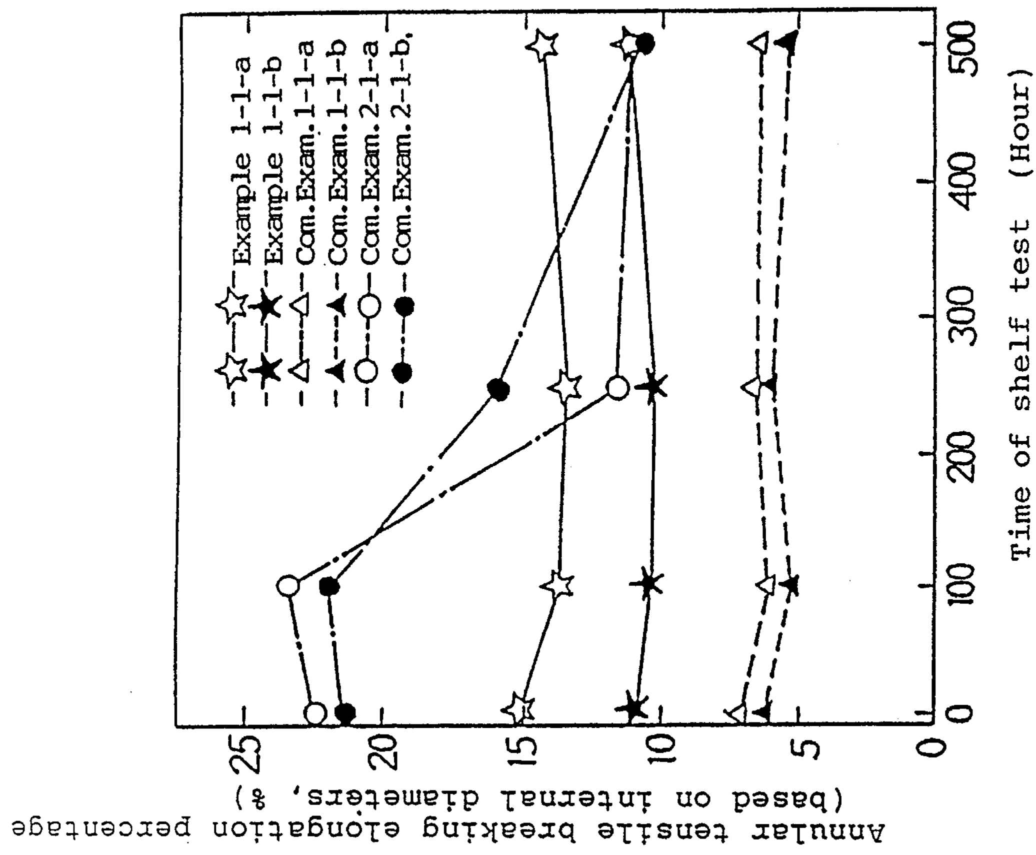
FIG. 8B is a chart showing the change in the annular tensile breaking elongation percentage after a thermal deterioration or shelf test in air (170° C.) conducted on the conical roller bearing holders of the examples 1-1-a and 1-1-b, and comparative examples 1-1-a, 1-1-b, 2-1-a and 2-1-b.
Figure 8A:
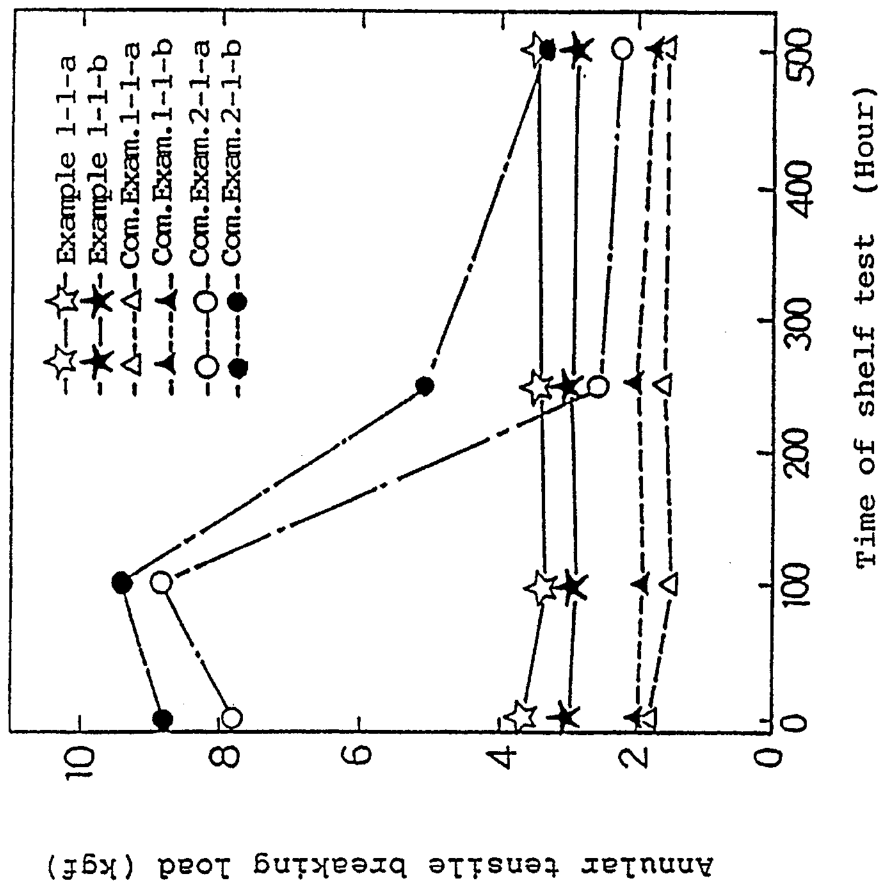
FIG. 8A is a chart showing the change in the annular tensile breaking load after a thermal deterioration or shelf test in air (170° C.) conducted on the conical roller bearing holders of examples 1-1-a and 1-1-b, and comparative examples 1-1-a, 1-1-b, 2-1-a and 2-1-b.
Figure 9B:
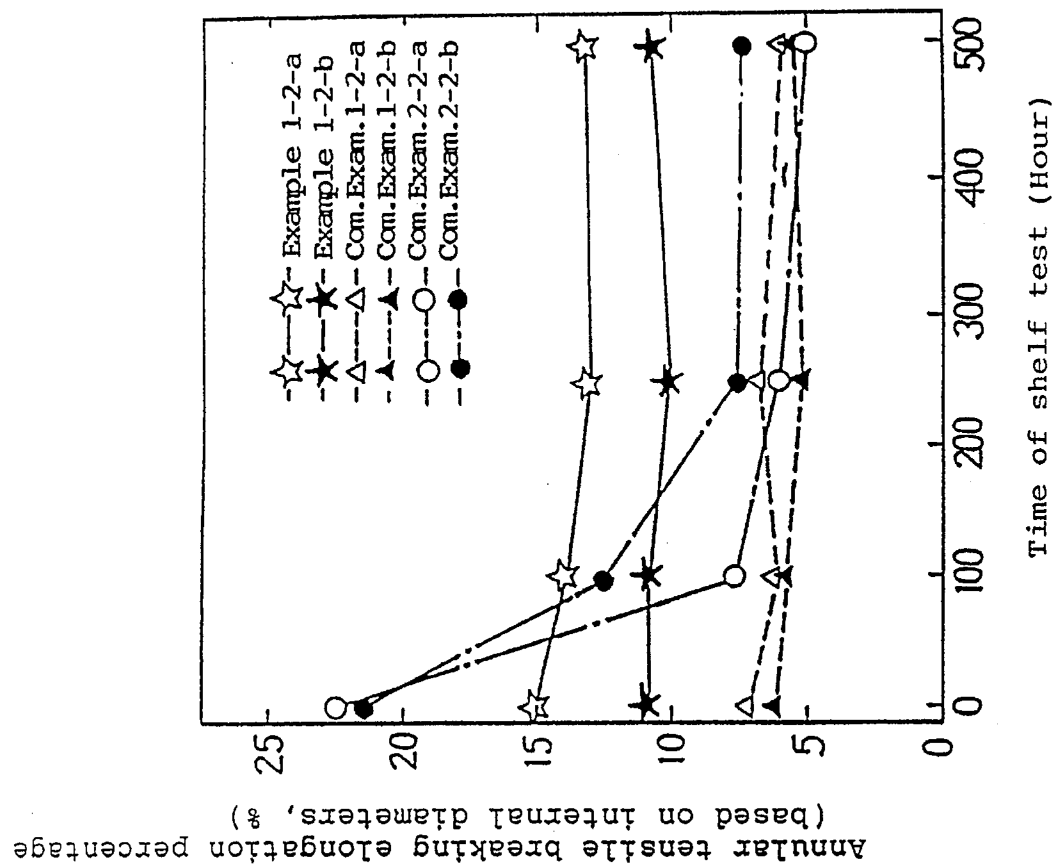
FIG. 9B is a chart showing the change in the annular tensile breaking elongation percentage after a thermal deterioration or shelf test in oil (150° C.) conducted on the conical roller bearing holders of the examples 1-2-a and 1-2-b, and comparative examples 1-2-a, 1-2-b, 2-2-a and 2-2-b.
Figure 9A:
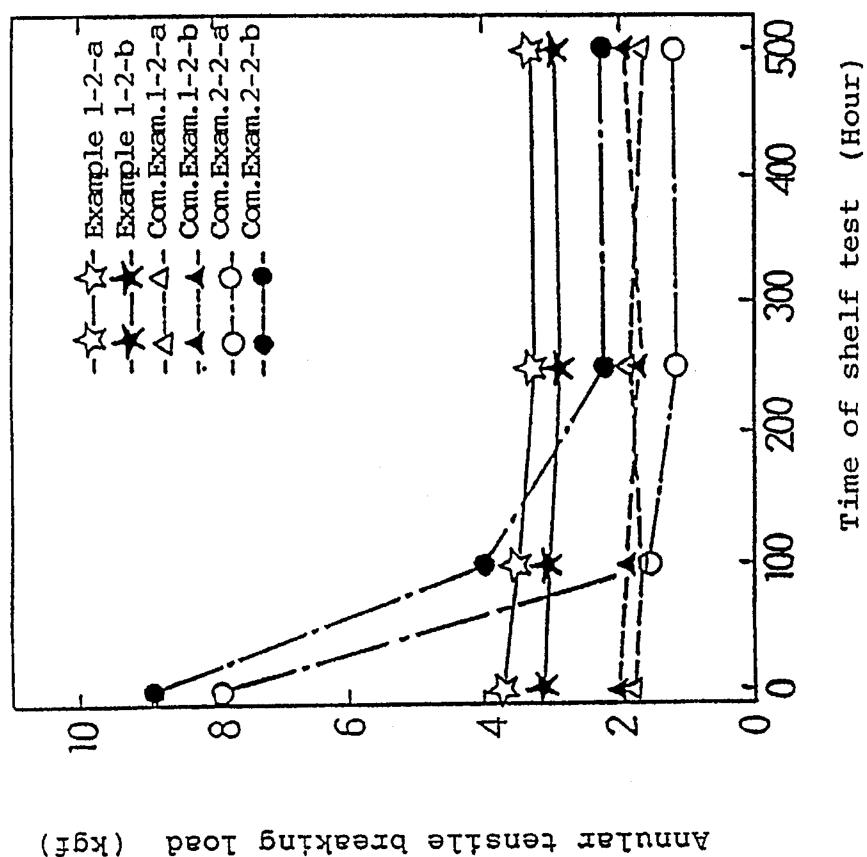
FIG. 9A is a chart showing the change in the annular tensile breaking load after a thermal deterioration or shelf test in oil (150° C.) conducted on the conical roller bearing holders of the examples 1-2-a and 1-2-b, and comparative examples 1-2-a, 1-2-b, 2-2-a and 2-2-b.

FIGS. 8A and 8B respectively show the time-dependent change in the annular tensile breaking load and in the annular tensile breaking elongation percentage based on the internal diameter of the samples of conical roller bearing holders deteriorated in air (170° C.), and FIGS. 9A and 9B show similar results on the samples deteriorated in oil (150° C.).

In case of deterioration in air, examples 1-1-a (GF=10 wt. %) and 1-1-b (GF=20 wt. %) utilizing the linear-chain PPS resin compositions were superior, in both the annular tensile breaking load and the annular tensile breaking elongation percentage, to comparative examples 1-1-a (GF=10 wt. % ) and 1-1-b (GF=20 wt. % ) utilizing the branched PPS resin compositions (FIGS. 8A and 8B). While the holders of the examples maintained sufficient performance over the entire range of the tests, the holders of the comparative examples were insufficient in performance even prior to the deterioration tests.

On the other hand, comparative examples 2-1-a (GF=10 wt. %) and 2-1-b (GF=20 wt. %) utilizing compositions of general-purpose nylon-6,6 resin showed higher values of annular tensile breaking load and annular tensile breaking elongation than those of the examples 1-1-a and 1-1-b prior to the deterioration test. However, these values rapidly decreased with the progress of deterioration, and particularly the comparative example 2-1-a with the lower GF content was deteriorated to a level inadequate for purposes of the holder after the lapse of 300 hours.

In case of deterioration in oil (FIGS. 9A and 9B), examples 1-2-a (GF=10 wt. %) and 1-2-b (GF=20 wt. %) utilizing the linear-chain PPS resin compositions were superior, in both the annular tensile breaking load and the annular tensile breaking elongation, to comparative examples 1-2-a (GF=10 wt. %) and 1-2-b (GF=20 wt. %) utilizing branched PPS resin compositions. In both the examples of the invention and the comparative examples, the change in the breaking load or breaking elongation with the lapse of deterioration time was small, and no significant difference could be observed in terms of the oil resistance. However, while the holders of the invention maintained sufficient performance over the entire range of the test, the holders of the comparative examples were insufficient in performance even prior to the deterioration test.

On the other hand, comparative examples 2-2-a (GF=10 wt. %) and 2-2-b (GF=20 wt. %) utilizing compositions of general-purpose nylon-6,6 resin showed higher values of annular tensile breaking load and annular tensile breaking elongation percentage than those of the examples 1-2-a and 1-2-b prior to the deterioration test. However, these values rapidly decreased with the progress of deterioration, and decreased to a level inadequate for purposes of the holder after the lapse of 200 hours.

Figure 10A:
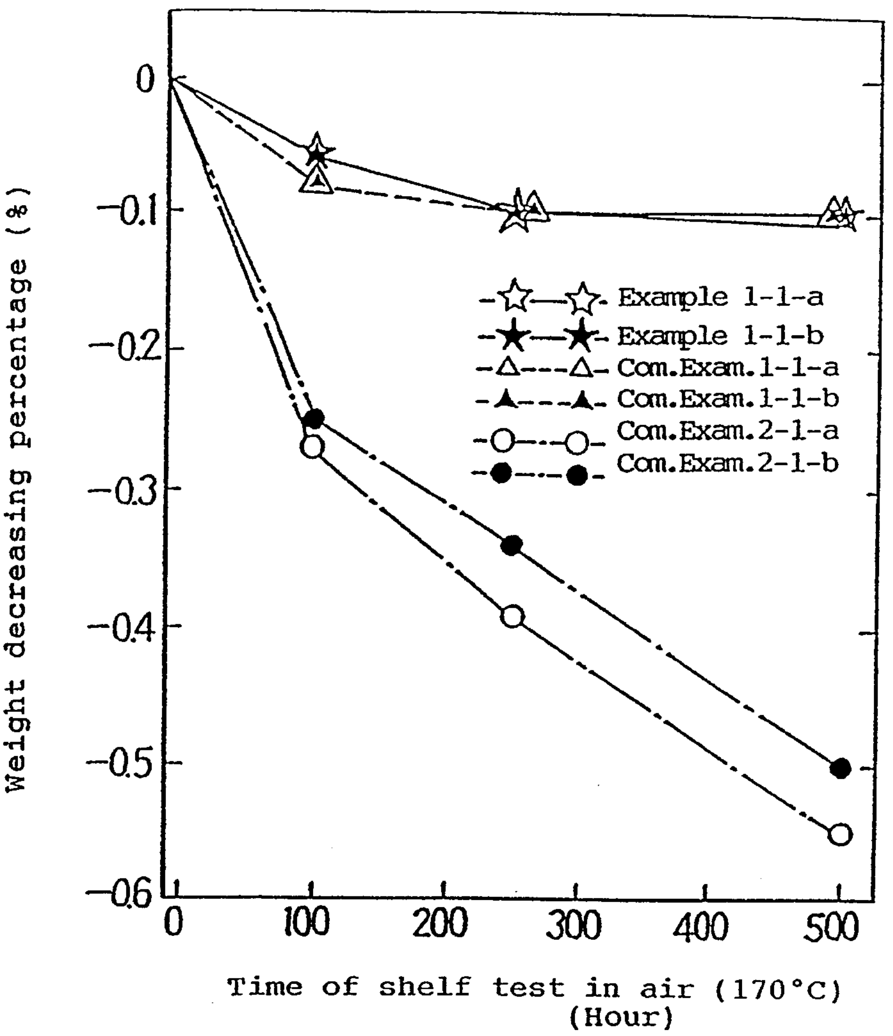
FIG. 10A is a chart showing the change in weight decreasing percentage after a deterioration or shelf test in air (170° C.) conducted on the conical roller bearing holders of the examples 1-1-a and 1-1-b, and comparative examples 1-1-a, 1-1-b, 2-1-a and 2-1-b.
Figure 10B:
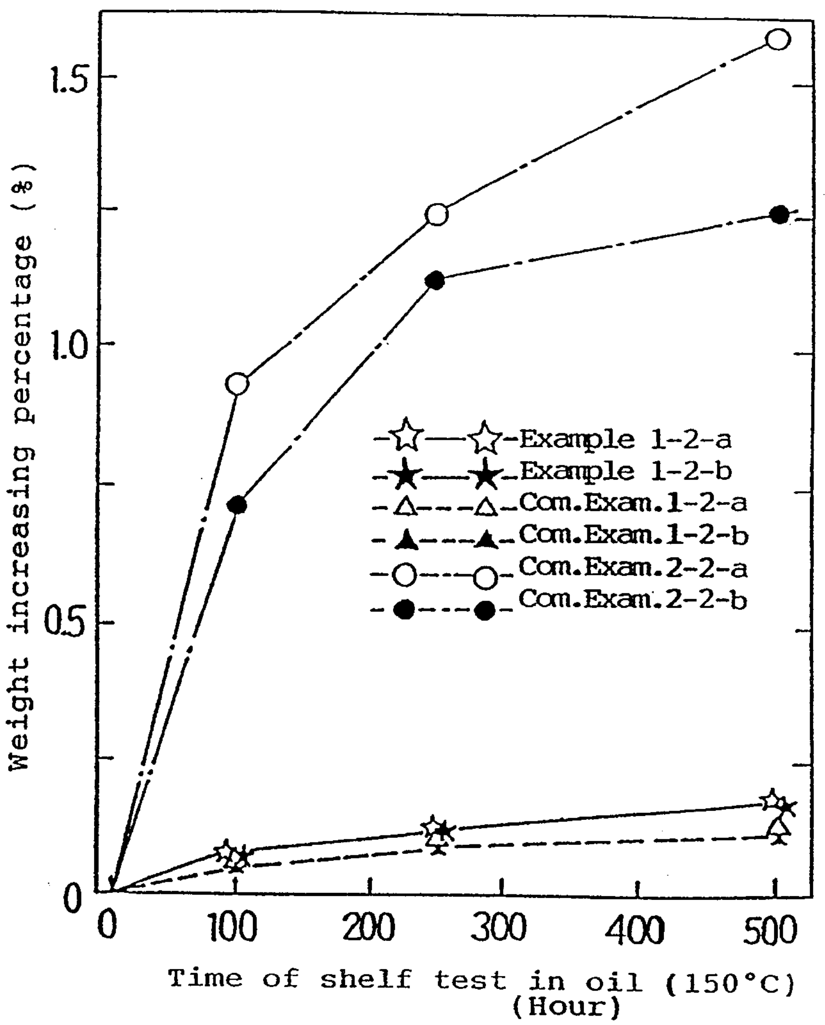
FIG. 10B is a chart showing the change in weight increasing percentage after a deterioration or shelf test in oil (150° C.) conducted on the conical roller bearing holders of the examples 1-2-a and 1-2-b, and comparative examples 1-2-a, 1-2-b, 2-2-a and 2-2-b.

FIGS. 10A and 10B show the weight change rate as a function of deterioration time, measured on holders deteriorated in air (170° C.) and in oil (150° C.), respectively.

In case of deterioration in air, there resulted loss of mass with the lapse of time (FIG. 10A). In the examples 1-1-a, 1-1-b utilizing the linear-chain PPS resin compositions and the comparative examples 1-1-a, 1-1-b utilizing the branched PPS resin compositions, the weight decreasing percentages were very small, indicating good thermal resistance, and not significantly different. However, the comparative examples 2-1-a, 2-1-b utilizing the compositions of ordinary nylon-6,6 resin showed evident increase in the weight decreasing percentage with the lapse of time, indicating a poor thermal resistance.

On the other hand, in case of deterioration in oil, there resulted increase of weight with the lapse of time, due to oil permeation (FIG. 10B). Also in this case, the examples 1-2-a, 1-2-b utilizing the linear-chain PPS resin compositions and the comparative examples 1-2-a, 1-2-b utilizing the branched PPS resin compositions showed very small weight increases, indicating satisfactory oil resistance. However, the comparative examples 2-2-a, 2-2-b utilizing the ordinary nylon-6,6 resin compositions showed evident weight increases with the lapse of time, indicating poor oil resistance.

The result of the roller assembling test is also indicated in Table 1, as, "percentage of success of roller assembling test".

The holders of the examples 1-1-a and 1-1-b utilizing the linear-chain PPS resin compositions and the holders of the comparative examples 2-1-a and 2-1-b utilizing the ordinary nylon-6,6 resin compositions could achieve automatic roller assembling with a percentage of success of 100%, but the holders of the comparative examples 1-1-a and 1-1-b utilizing the branched PPS resin compositions could not achieve the automatic roller assembling due to the breakage of flange of the holders during the assembling operation.

The foregoing results indicate that the holders made of the linear-chain PPS resin compositions have sufficient performance not only in ordinary conditions of use but also in harsh conditions, as in hot air or in hot oil. On the other hand, the holders made of the ordinary nylon-6,6 resin compositions show excellent performance under normal conditions of use, but are rapidly deteriorated for example in hot air or in hot oil exceeding 150° C., thus losing the properties required for the holders within a short period. As to the holders made of the branched PPS resin compositions, these lack suitable properties from the outset.

| | Composition (Weight %) | | | | Percentage of |
|---|---|---|---|---|---|
| | PPS resin | | Nylon- | Short | success in |
| Test Sample | Linear chain | Branched | 6,6 resin | glass fiber | roller assembling test (%) |
| Example | | | | | |
| 1-1-a | 90 | — | — | 10 | 100 |
| 1-1-b | 80 | — | — | 20 | 100 |
| 1-2-a | 90 | — | — | 10 | |
| 1-2-b | 80 | — | — | 20 | |
| Comp. Example | | | | | |
| 1-1-a | — | 90 | — | 10 | 0 |
| 1-1-b | — | 80 | — | 20 | 0 |
| 1-2-a | — | 90 | — | 10 | |
| 1-2-b | — | 80 | — | 20 | |
| 2-1-a | — | — | 90 | 10 | 100 |
| 2-1-b | — | — | 80 | 20 | 100 |
| 2-2-a | — | — | 90 | 10 | |
| 2-2-b | — | — | 80 | 20 | |

EXAMPLES 2-1, 2-2 AND COMPARATIVE EXAMPLES 3-1, 3-2, 4-1 AND 4-2

Holders for spherical roller bearings were prepared with compositions shown in Table 2 and subjected to various tests.

Figure 11:
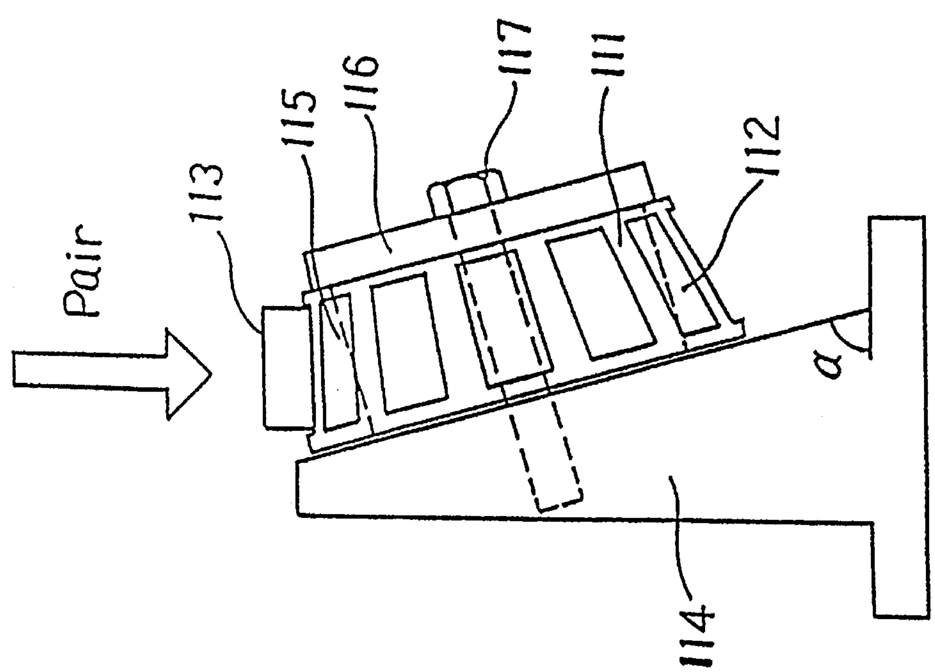
FIG. 11 is a schematic view of a jig used in a roller assembling test into the spherical roller bearing holders.

The linear-chain PPS resin, branched PPS resin, thermally resistant nylon-6,6 resin, and short glass fibers employed in the preparation of the compositions were the same as those of the initial group of examples. The same is true of the twin-screw extruder used in the preparation of the pellets of compositions; the injection molding apparatus used in the preparation of the spherical roller bearing holders; the method of preparation of test pieces for deterioration testing in air and in oil; and the method of measurement of the tensile breaking load and elongation of the deteriorated holders. The roller assembling test into the holders was conducted, as in the previous examples, with an air-driven automatic roller assembling apparatus (FIG. 7B) manufactured by Nippon Seiko Kabushiki Kaisha, except that in this case, a special jig shown in FIG. 11 was employed to lodge a roller into each pocket of the holder. More specifically, a support member 114 having a slanted face of an angle α equal to the angle between the flange of larger diameter and the side wall of the holder 111 is fixed to a disk 115 of a diameter the same as the smaller internal diameter of the holder and a height same as that of the holder. The holder is inserted thereon in such a manner that the flange of larger diameter thereof is in contact with the slanted face of said support member 114. Then a pressing plate 116 and a bolt 117 are used to fix the holder in such a manner that a desired one of pockets 112 is in the uppermost position. In this manner the roller can receive an assembling pressure perpendicular to the axis of the roller at the assembling operation. A roller 113 is placed on the uppermost pocket, and a punch (FIG. 7B) fixed at the front end of a cylinder rod of an air cylinder is pressed against said roller 113, as indicated diagrammatically in FIG. 11 thus pushing said roller into the pocket of the holder. The above-explained operation is repeated in succession to other pockets, thereby lodging the rollers into all the pockets of the holder. The moving speed and the load of the air cylinder were respectively 0.2 m/sec. and 60 kgf.

Figure 12:
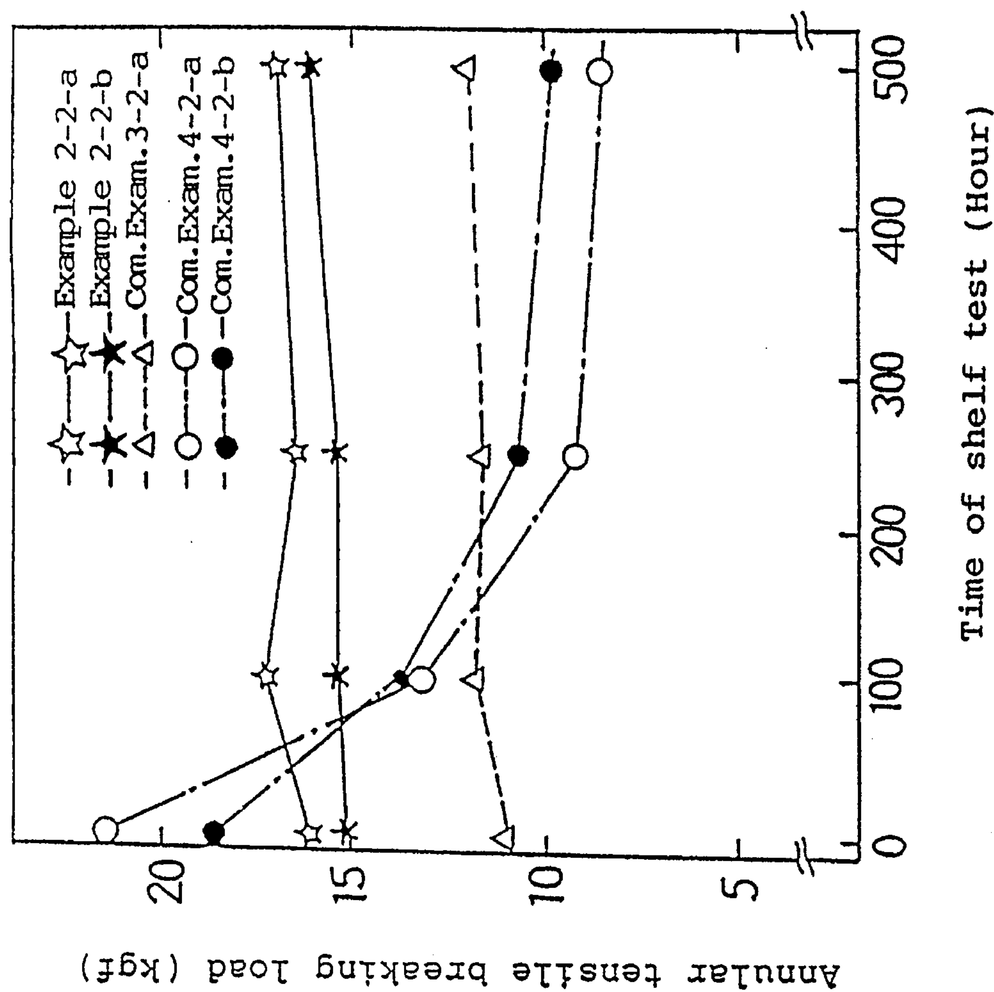
FIG. 12 is a chart showing the change in the annular tensile breaking load after a deterioration or shelf test in oil (150° C.) conducted on the cylindrical roller bearing holders of examples 2-2-a and 2-2-b, and comparative examples 3-2-a, 4-2-a and 4-2-b.

FIG. 12 shows the time-dependent change in the annular tensile breaking load for the spherical roller bearing holders subjected to deterioration in oil (150° C.).

Examples 2-2-a (GF=25 wt. %) and 2-2-b (GF=40 wt. %) utilizing the linear-chain PPS resin compositions were superior, in the annular tensile breaking strength, to comparative example 3-2-a (GF=25 wt. %) utilizing the branched PPS resin composition, and showed performance sufficient over the entire range of the test. The holder of the comparative example 3-2-a utilizing the branched PPS resin composition showed little time-dependent change as did those of the linear-chain PPS resin compositions, indicating sufficient oil resistance. However the mechanical strength is close to the limit value admissible for the holders.

TABLE 2

| | Composition (Weight %) | | | | Percentage of |
|---|---|---|---|---|---|
| | PPS resin | | Nylon- | Short | success in |
| Test Sample | Linear chain | Branched | 6,6 resin | glass fiber | roller assembling test (%) |
| Example | | | | | |
| 2-1-a | 75 | — | — | 25 | 100 |
| 2-1-b | 60 | — | — | 40 | 100 |
| 2-2-a | 75 | — | — | 25 | |
| 2-2-b | 60 | — | — | 40 | |
| Comp. Example | | | | | |
| 3-1-a | — | 75 | — | 25 | 100 |
| 3-2-a | — | 75 | — | 25 | |
| 4-1-a | — | — | 75 | 25 | 100 |
| 4-1-b | — | — | 60 | 40 | 100 |
| 4-2-a | — | — | 75 | 25 | |
| 4-2-b | — | — | 60 | 40 | |

On the other hand, comparative examples 4-2-a (GF=25 wt. %) and 4-2-b (GF=40 wt. %) utilizing the ordinary nylon-6,6 resin compositions showed higher breaking strengths than the examples 2-2-a and 2-2-b utilizing the linear-chain PPS resin compositions prior to the deteriorating test, but these values rapidly decreased with the increase of deteriorating time and reached an unacceptable after deterioration for 200 hours.

FIG. 13 shows the time-dependent change in weight for the spherical roller bearing holders deteriorated in air (170° C.) and in oil (150 ° C.).

Figure 13A:
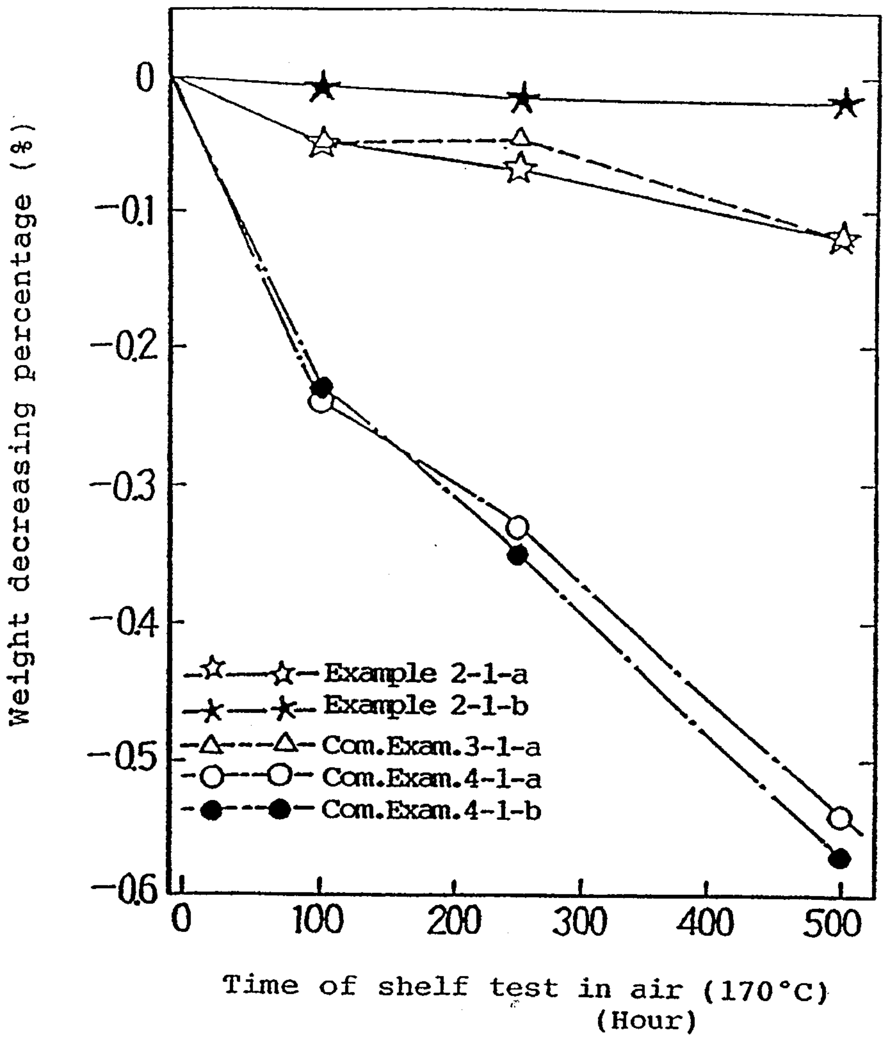
FIG. 13A is a chart showing the change in the weight decreasing percentage after a deterioration or shelf test in air (170° C.) conducted on the spherical roller bearing holders of examples 2-1-a and 2-1-b, and comparative examples 3-1-a, 4-1-a and 4-1-b.
Figure 13B:
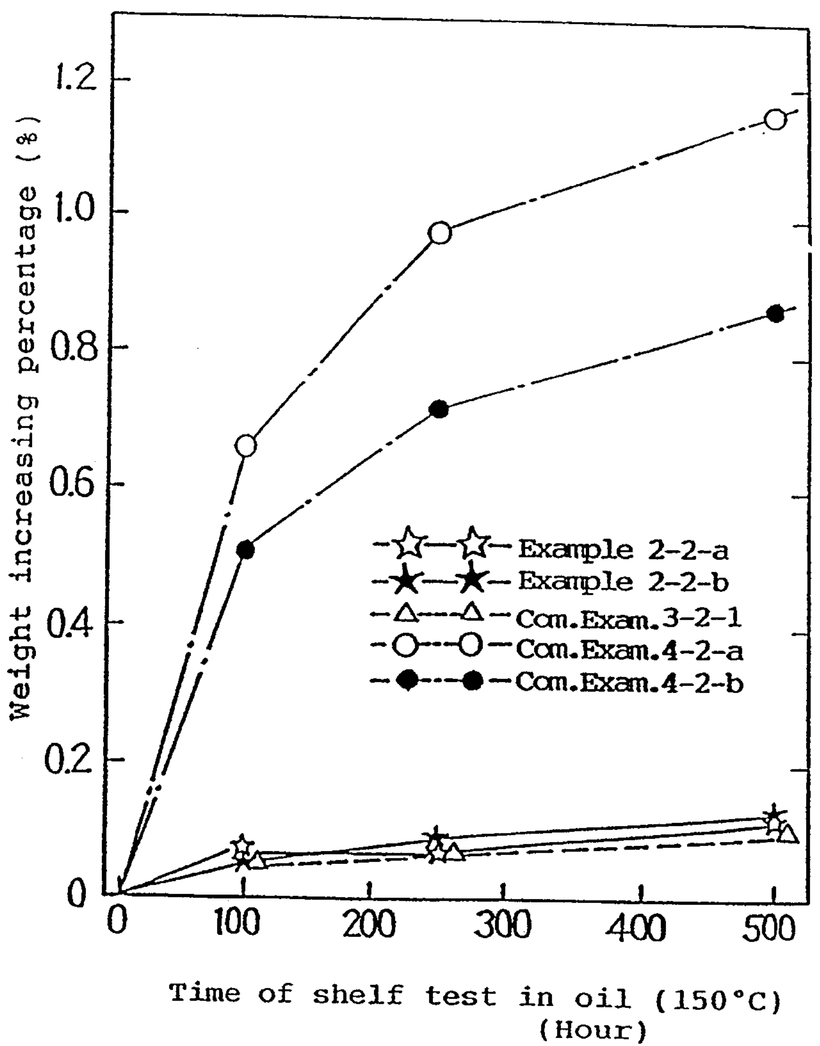
FIG. 13B is a chart showing the change in the weight increasing percentage after a deterioration or shelf test in oil (150° C.) conducted on the spherical roller bearing holders of examples 2-2-a and 2-2-b, and comparative examples 3-2-a, 4-2-a and 4-2-b.

The weight decreasing percentage for the deterioration in air (170° C.), shown in FIG. 13A, was very small in the examples 2-1-a (GF=25 wt. %) and 2-1-b (GF=40 wt. %) utilizing the linear-chain PPS resin compositions, and in the comparative example 3-1-a (GF=25 wt. %) utilizing the branched PPS resin composition, indicating a good thermal resistance. Also, a comparison of the example 2-1-a with comparative example 3-1-a of a same glass fiber content indicates that there is no significant difference in thermal resistance between the holder of the linear-chain PPS resin composition and that of the branched PPS resin composition. On the other hand, comparative examples 4-1-a (GF=25 wt. %) and 4-1-b (GF=40 wt. %) utilizing the ordinary nylon-6,6 resin composition showed rapid increase of weight loss with the lapse of time, indicating a poor thermal resistance.

On the other hand, the weight increasing S percentage resulting from deterioration in oil (FIG. 13B) was also very small in the examples 2-2-a and 2-2-b utilizing the linear-chain PPS resin compositions and the comparative example 3-2-a utilizing the branched PPS resin composition, indicating a good oil resistance. However, comparative examples 4-2-a and 4-2-b utilizing the ordinary nylon-6,6 resin compositions showed rapid weight increases with the lapse of time, indicating a poor oil resistance.

The results of the roller assembling test are also shown in Table 2.

As the snapping action of the holders employed in said test was relatively loose, the assembling test showed a 100% success for all the holders tested.

EXAMPLES 3-1, 3-2 AND COMPARATIVE EXAMPLES 5-1, 5-2, 6-1 AND 6-2

Holders for cylindrical roller bearings were prepared with the compositions shown in Table 3 and were subjected to various tests.

TABLE 3

| | Composition (Weight %) | | | | Percentage of |
|---|---|---|---|---|---|
| | PPS resin | | Nylon- | Short | success in |
| Test Sample | Linear chain | Branched | 6,6 resin | glass fiber | roller assembling test (%) |
| Example | | | | | |
| 3-1-a | 80 | — | — | 20 | 100 |
| 3-1-b | 75 | — | — | 25 | 100 |
| 3-2-a | 80 | — | — | 20 | |
| 3-2-b | 75 | — | — | 25 | |
| Comp. Example | | | | | |
| 5-1-a | — | 75 | — | 25 | 0 |
| 5-2-a | — | 75 | — | 25 | |
| 6-1-a | — | — | 80 | 20 | 100 |
| 6-1-b | — | — | 75 | 25 | 100 |
| 6-2-a | — | — | 80 | 20 | |
| 6-2-b | — | — | 75 | 25 | |

Figure 14:
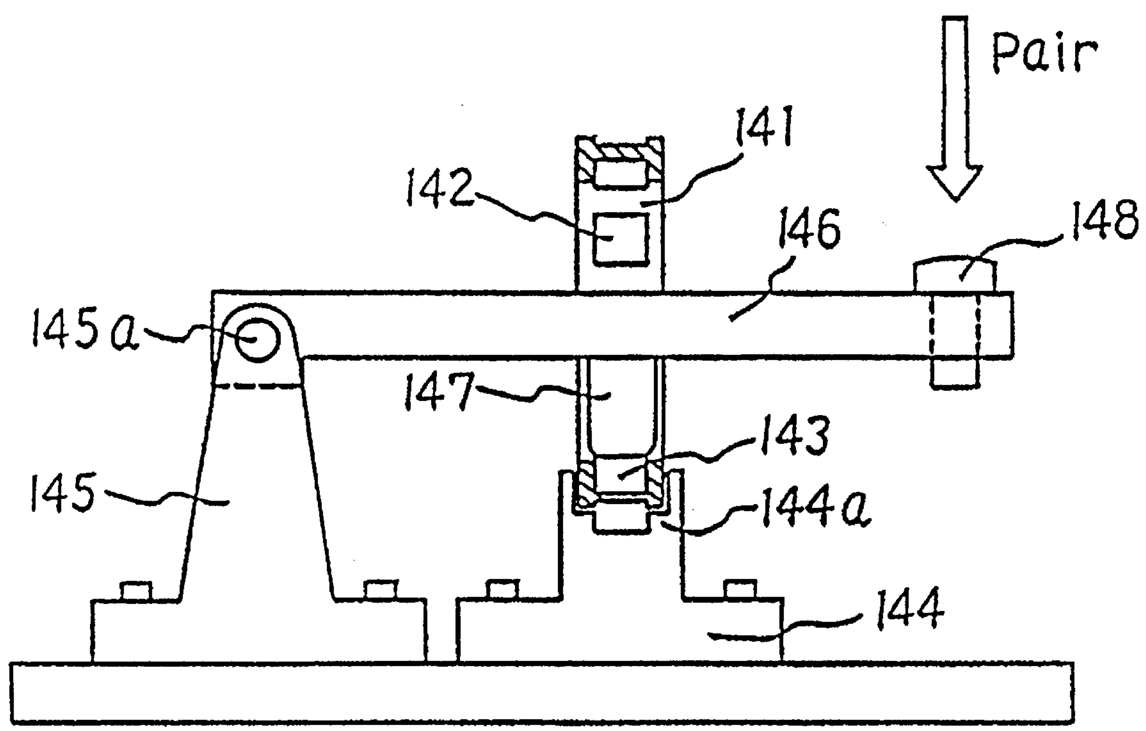
FIG. 14 is a schematic view of a jig used in an automatic roller assembling test into the cylindrical roller bearing holders.

The linear-chain PPS resin, branched PPS resin, thermally stable nylon-6,6 resin, and short glass fibers employed in the preparation of the compositions were the same as in the initial group of examples. The same is true of the twin-screw used in the preparation of the pellets of compositions; the injection molding apparatus used in the preparation of the spherical roller bearing holders; and the method of preparation of test pieces for deterioration tests in air and in oil. The measurement of the annular tensile breaking load and elongation of the deteriorated holders was conducted in the same manner as in the initial group of examples, except that the flange portion including the weld portion was removed from the holder as a test piece, and was mounted on a push-pull stand in such a manner that said weld portion was positioned above in the vertical direction. Also, the roller assembling test was conducted in the same manner as in the second group of examples except the-use of a special jig shown in FIG. 14. The jig of FIG. 14 includes a support member 144 having a support portion **144*a* with a recess of rectangular cross section. The recess has a width equal to that of the holder and a curvature the same as that of the external periphery of the holder. The center of the recess is formed with a groove of rectangular cross section with a width the same as the height of the pockets of the holder. For roller assembly, a holder 141 is positioned in the recess in such a manner that a desired one of pockets 142 is positioned horizontally. Then a roller 143 is placed in a pocket from the internal side of the holder. Subsequently an arm 146, articulated from the upper portion 145*a* of a pillar 145 fixed on the same frame as said support member 144, is placed on the center of the flange of the holder 141 and in a perpendicular direction to the flange face. In this position, that a punch 147 fixed at the middle of said arm is in contact with said roller 143. The above-explained jig is so placed that a punch 10 (FIG. 7B) of a cylinder rod of an air cylinder of the air-driven automatic roller assembling apparatus is in contact with the free end 148 of said arm, and the roller is lodged into the pocket by the lever action caused by the air pressure supplied to the air cylinder. The Above-explained operation was repeated in succession for all other pockets, thereby assembling the rollers in all the pockets. The assembling speed was 0.2 m/sec. and the load was 60 kgf. In FIG. 14, the holder 141** is represented by the cross section thereof.

Figure 15B:
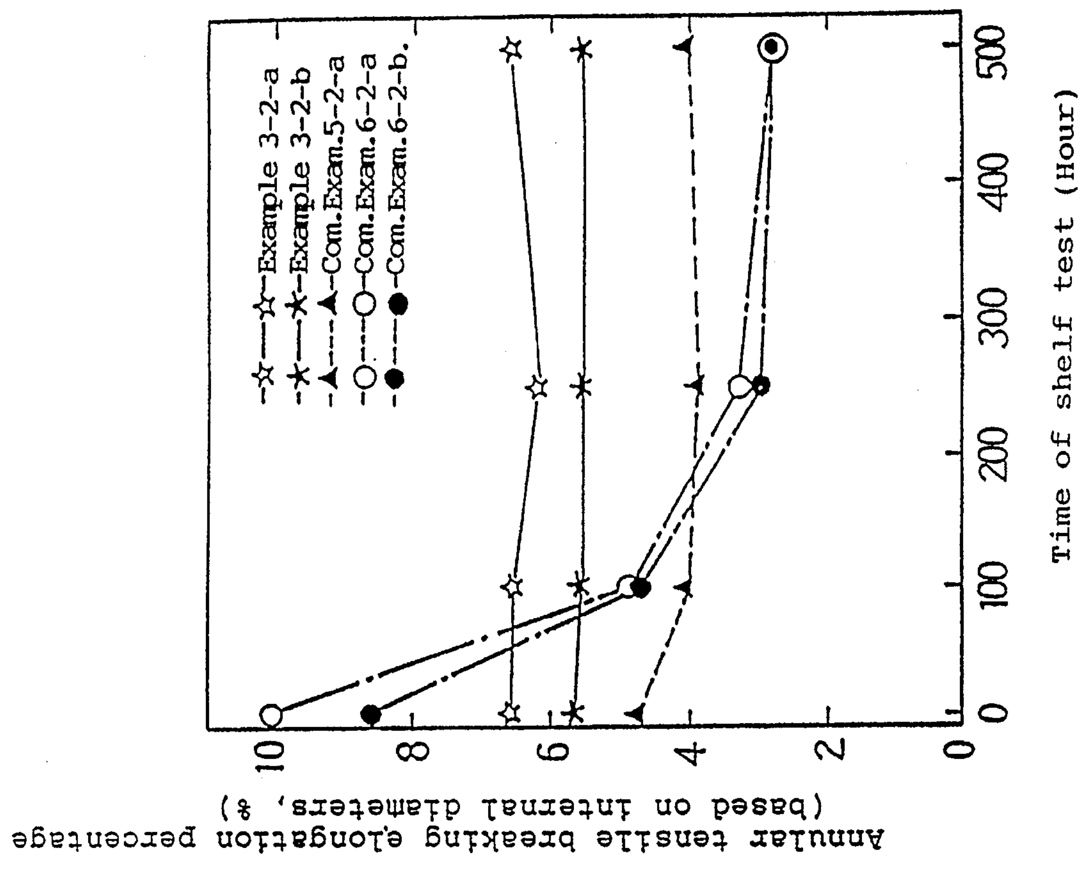
FIG. 15B is a chart showing the change in the annular tensile breaking elongation percentage after a deterioration or shelf test in oil (150° C.) conducted on the cylindrical roller bearing holders of examples 3-2-a and 3-2-b, and comparative examples 5-2-a, 6-2-a and 6-2-b.
Figure 15A:
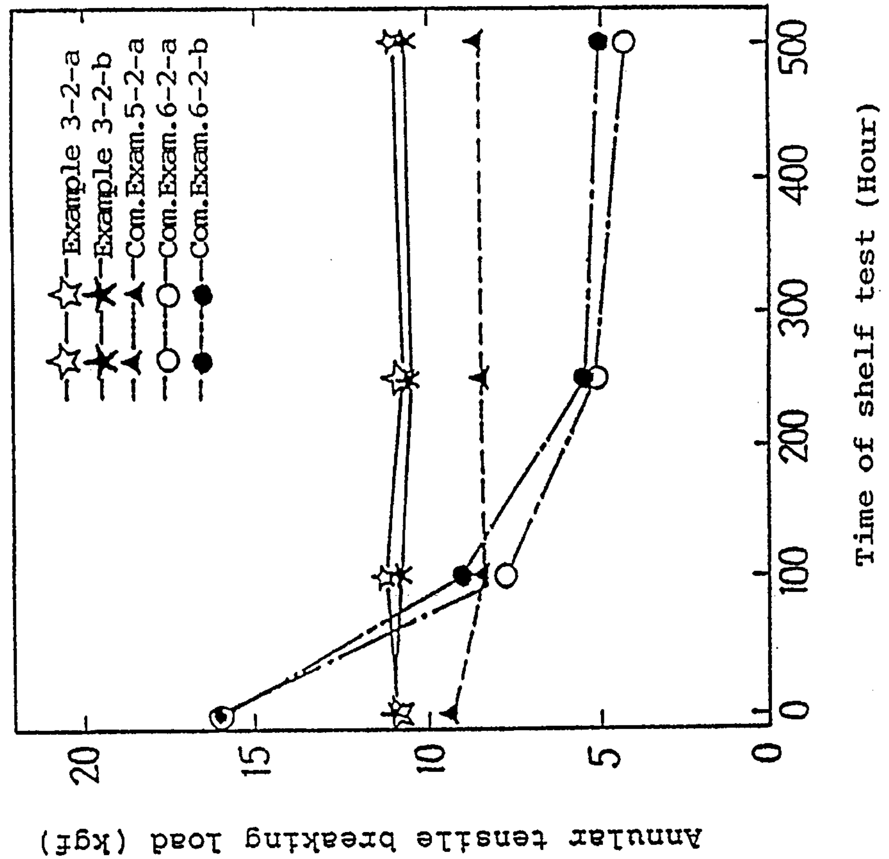
FIG. 15A is a chart showing the change in the annular tensile breaking load after a deterioration or shelf test in oil (150° C.) conducted on the cylindrical roller bearing holders of examples 3-2-a and 3-2-b, and comparative examples 5-2-a, 6-2-a and 6-2-b.

FIGS. 15A and 15B show the time-dependent changes in the annular tensile breaking load and the annular tensile breaking elongation percentage evaluated for the internal diameter, measured on the cylindrical roller bearing holders aged in oil (150° C.).

Examples 3-2-a (GF=20 wt. %) and 3-2-b (GF=25 wt. %) utilizing the linear-chain PPS resin compositions were evidently superior, in the annular tensile breaking load (FIG. 15A) and in the annular tensile breaking elongation percentage (FIG. 15B), to comparative example 5-2-a (GF=20 wt. %) utilizing the branched PPS resin composition. For these examples these properties showed little changes and maintained levels sufficient for the holders over the entire range of the tests, but the properties of the branched PPS resin holder were clearly inferior and close to the limit of acceptable values. On the other hand, the breaking load and the breaking elongation percentage of comparative examples 6-2-a (GF=20 wt. %) and 6-2-b (GF=25 wt. %) utilizing the ordinary nylon-6,6 resin compositions were larger than those of the holders with the linear-chain PPS resin compositions prior to the deterioration test, but rapidly decreased with deterioration time, reaching an unusable level after the lapse of 100 hours.

Figure 16A:
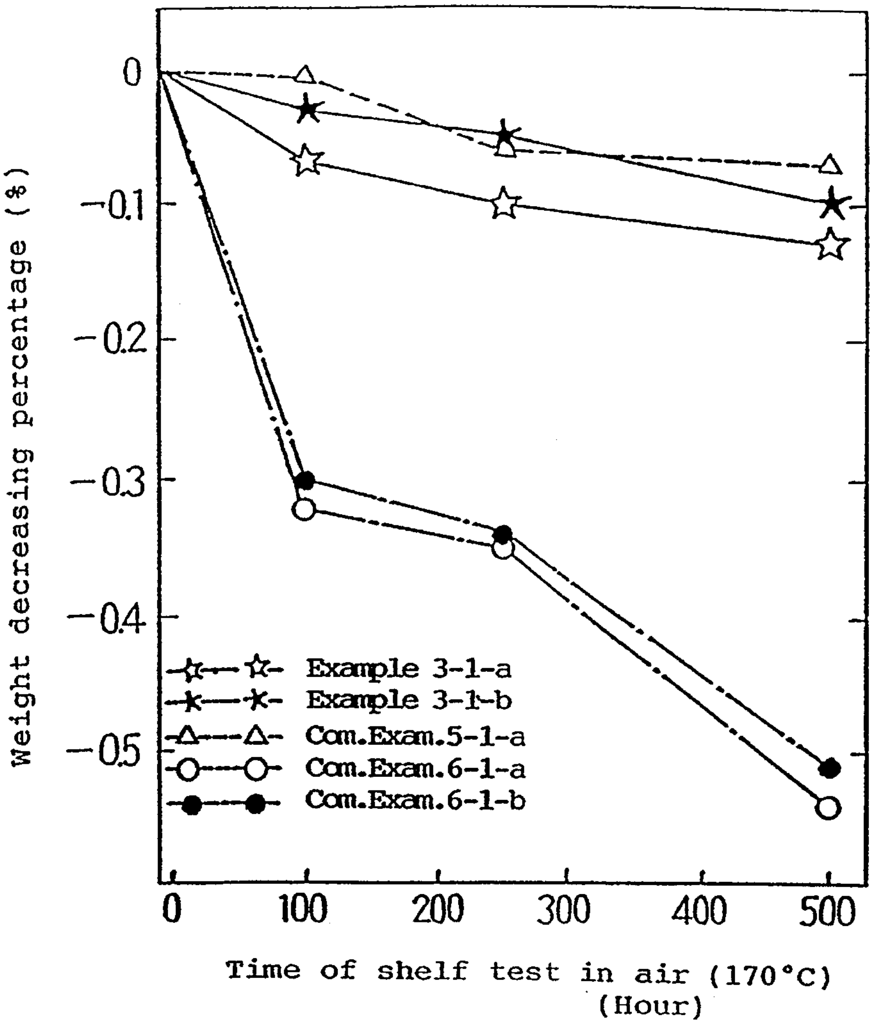
FIG. 16A is a chart showing the change in the weight decreasing percentage after a deterioration or shelf test in air (170° C.) conducted on the cylindrical roller bearing holders of examples 3-1-a and 3-1-b, and comparative examples 5-1-a, 6-1-a and 6-1-b.
Figure 16B:
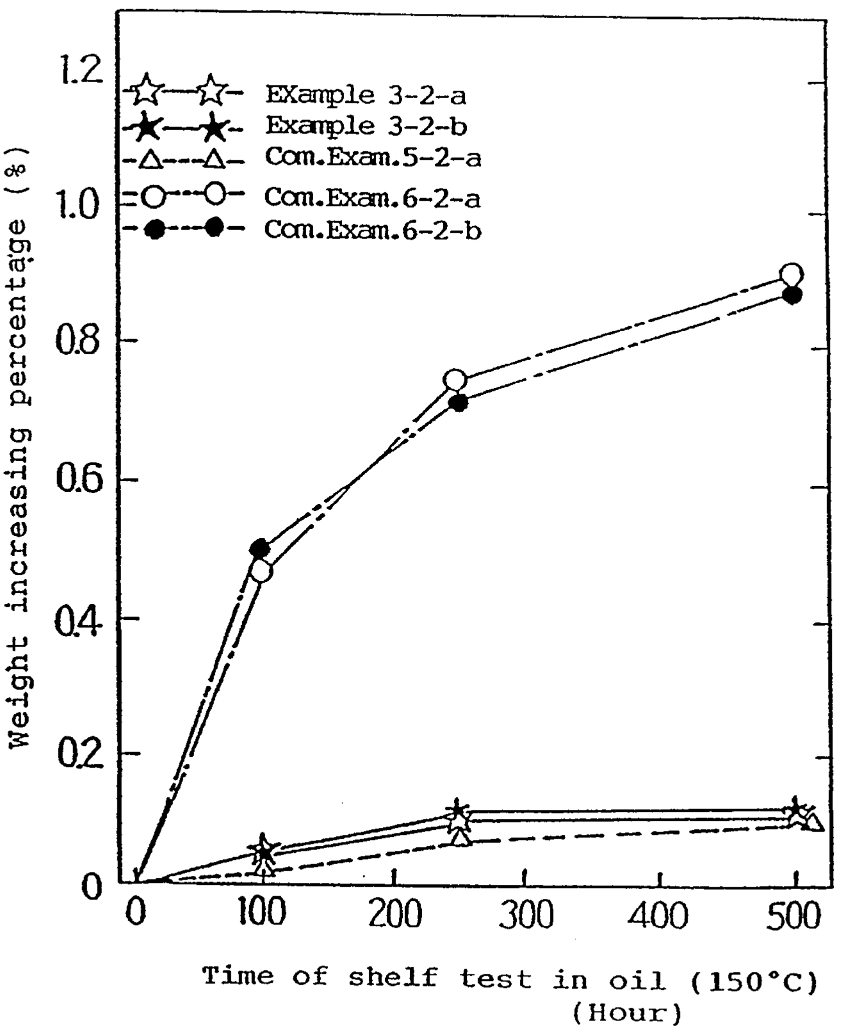
FIG. 16B is a chart showing the change in the weight increasing percentage after a deterioration or shelf test in oil (150° C.) conducted on the cylindrical roller bearing holders of examples 3-2-a and 3-2-b, and comparative examples 5-2-a, 6-2-a and 6-2-b.

FIG. 16 shows the time-dependent change in the weight change percentage, measured for the cylindrical roller bearing holders deteriorated in air (170° C.) or in oil (150° C.).

The weight decreasing percentage after deterioration in air (FIG. 16A) and the weight increasing percentage after deterioration in oil (FIG. 16B) were very small, indicating satisfactory thermal resistance and oil resistance in examples 3-1-a (GF=20 wt. %) and 3-1-b (GF=25 wt. %) utilizing the linear-chain PPS resin compositions and in comparative examples 5-1-a (GF=20 wt. %) and 5-2-a utilizing the branched PPS resin composition. However, comparative examples 6-1-a (GF=20 wt. %), 6-1-b (GF=25 wt. %), 6-2-a and 6-2-b utilizing the ordinary nylon-6,6 resin compositions showed rapid weight changes with deterioration, indicating poor thermal resistance and oil resistance.

The results of the roller assembling test are also shown in Table 3.

The examples 3-1-a and 3-1-b utilizing the linear-chain PPS resin compositions, and the comparative examples 6-1-a and 6-1-b utilizing the ordinary nylon-6,6 resin compositions could achieve automatic roller assembling with a success rate of 100%. On the other hand, the comparative example 5-1-a utilizing the branched PPS resin composition could not achieve the automatic roller assembling at all, due to the breakage of the flange portion of the holders during the assembling operation.

The foregoing test results are summarized in Table 4, which includes the results of FIGS. 8A, 8B, 9A, 9B, 10A, 10B, 12, 13A, 13B, 15A, 15B, 16A and 16B, and Tables 1 to 3.

From Table 4 it will be understood that the holders prepared from the linear-chain PPS resin compositions, regardless whether they are for conical roller bearings, spherical roller bearings or cylindrical roller bearings, show satisfactory levels in the annular tensile breaking load, annular tensile breaking elongation percentage and weight change percentage over the entire period of testing. Also, the automatic roller assembling operation can be conducted without problem, as in the conventional holders utilizing the compositions of thermally resistant nylon-6,6. On the other hand, the holders made of the branched PPS resin compositions have satisfactory thermal and oil resistances, but are extremely fragile, as indicated by the breakage of holders in the roller assembling test except for the spherical roller bearing holders with looser snap action. Also, the annular tensile breaking elongation does not reach a level required for the holders.

On the other hand, the holders prepared from the thermally resistant nylon-6,6 resin composition are superior to those of the linear-chain PPS resin compositions prior to the deterioration test, but the annular tensile breaking load and the annular tensile breaking elongation rapidly decrease with the progress of deterioration, and the weight also shows a large change. Thus they are inferior in thermal and oil resistances, and are deteriorated to an unusable level after 100–200 hours.

Thus the holders of the linear-chain PPS resin compositions of the present invention can be satisfactorily used under harsh conditions such as in hot air or in hot oil.

Figure 1:
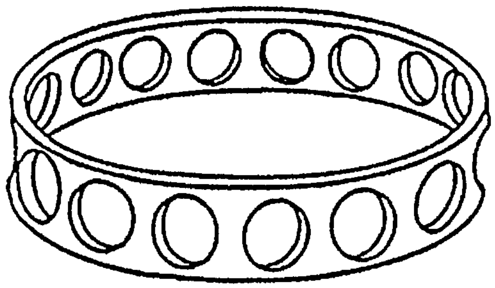
FIG. 1 is a perspective view of a holder for an ordinary ball bearing.
Figure 2:
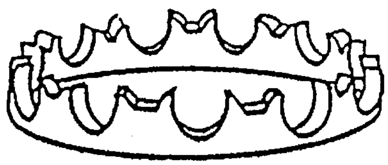
FIG. 2 is a perspective view of a crown holder for a ball bearing.
Figure 3:
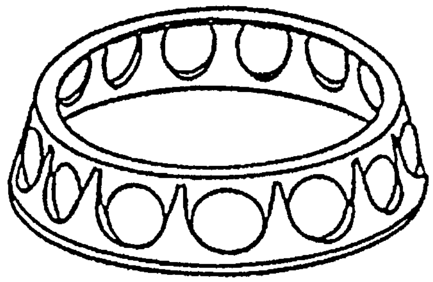
FIG. 3 is a perspective view of a holder for an angular ball bearing.
Figure 4:
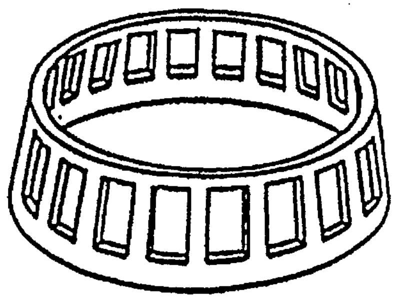
FIG. 4 is a perspective view of a holder for a conical roller bearing.
Figure 5:
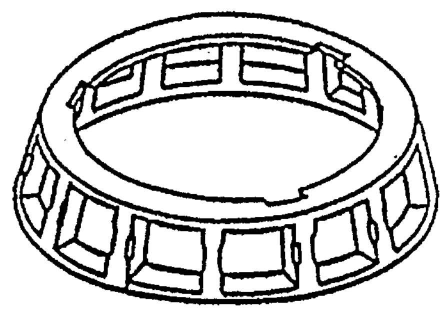
FIG. 5 is a perspective view of a holder for a spherical roller bearing.
Figure 6:
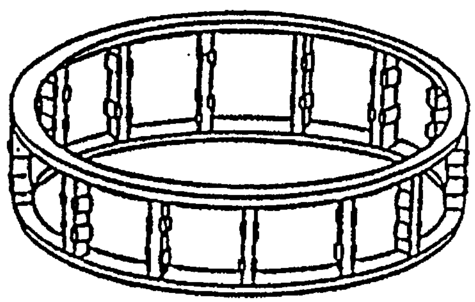
FIG. 6 is a perspective view of a holder for a cylindrical roller bearing.

In the foregoing embodiments, the assembling tests were conducted with the holders for the conical roller bearings and cylindrical roller bearings which are considered most unfavorable for the assembling operation in terms of the shape, but other holders prepared from the linear-chain PPS resin compositions will evidently show satisfactory performance. Consequently, the holders of the present invention are applicable not only to the conical roller bearings, spherical roller bearings and cylindrical roller bearings shown in the foregoing examples but also to those for the ordinary ball bearings shown in FIG. 1, crown ball bearing holders shown in FIG. 2, angular ball bearing holders shown in FIG. 3, needle bearing holders and roller clutch holders.

As explained in the foregoing, the present invention employs linear-chain PPS resin, excellent in tenacity, thermal resistance and chemical resistance, as the matrix resin for producing the holders, and thus provides holders capable of withstanding prolonged use under harsh conditions (high temperature, presence of oil or chemicals, high-speed rotation or high load). Also, the holders of the present invention have the snap fitting ability generally required in the manufacture of holders or in the assembly of bearings, and they exhibit other beneficial and are provided with other mechanical properties.

TABLE 4

| | | | | | TEST | | | | Evaluation | | | | | |
|---|---|---|---|---|---|---|---|---|---|---|---|---|---|---|
| | | | | | Deteriorating in air (170° C.) | | | | Deteriorating in oil (150° C.) | | | | Annular | |
| FIG./ Tab. | Example/ Comp. Ex. | Holder type | Matrix Material | GF % | Breaking load | Breaking elongn. | Weight loss | Assembling test | Breaking load | Breaking elongn. | Weight increase | Assembling test | tensile breaking elongn. | Weight change rate |
| | Ex. | | | | | | | | | | | | | |
| Tab. 1 FIG. 8A FIG. 8B FIG. 10A | 1-1-a | conical roller | A | 10 | o | o | o | o | | | | o | D > A > C up to 200 hr | A ÷ C >> D |
| | 1-1-b | conical roller | A | 20 | o | o | o | o | | | | o | | |
| | Comp. Ex. | | | | | | | | | | | | | |
| | 1-1-a | conical roller | C | 10 | o | o | o | o | | | | x | A > D > C for 200 hr or longer | |
| | 1-1-b | conical roller | C | 20 | o | o | o | o | | | | x | | |
| | 2-1-a | conical roller | D | 10 | o | o | o | o | | | | o | | |
| | 2-1-b | conical roller | D | 20 | o | o | o | o | | | | o | | |

TABLE 4-continued

| FIG./ Tab. | Example/ Comp. Ex. | Holder type | Matrix Material | GF % | TEST: Deteriorating in air (170° C.) Breaking load | TEST: Deteriorating in air (170° C.) Breaking elongn. | TEST: Weight loss | TEST: Assembling test | Evaluation: Deteriorating in oil (150° C.) Breaking load | Evaluation: Deteriorating in oil (150° C.) Breaking elongn. | Evaluation: Weight increase | Evaluation: Assembling test | Evaluation: Annular tensile breaking elongn. | Evaluation: Weight change rate |
|---|---|---|---|---|---|---|---|---|---|---|---|---|---|---|
| | Ex. | | | | | | | | | | | | | |
| | Ex. | | | | | | | | | | | | | |
| Tab. 1 FIG. | 1-2-a | conical roller | A | 10 | | | | | ○ | ○ | ○ | | D > A > C up to 100 hr | A ÷ C >> D |
| 9A FIG. | 1-2-b | conical roller | A | 20 | | | | | ○ | ○ | ○ | | | |
| 9b FIG. | Comp. Ex. | | | | | | | | | | | | | |
| 10b | 1-2-a | conical roller | C | 10 | | | | | ○ | ○ | ○ | | A >> D = for 100 hr or longer | |
| | 1-2-b | conical roller | C | 20 | | | | | ○ | ○ | ○ | | | |
| | 2-2-a | conical roller | D | 10 | | | | | ○ | ○ | ○ | | | |
| | 2-2-b | conical roller | D | 20 | | | | | ○ | ○ | ○ | | | |
| | Ex. | | | | | | | | | | | | | |
| Tab. 2 FIG. 13A | 2-1-a | spherical roller | A | 25 | | | ○ | ○ | | | | ○ | C >> D | |
| | 2-1-b | spercal roller | A | 40 | | | ○ | ○ | | | | ○ | | |
| | Comp. Ex. | | | | | | | | | | | | | |
| | 3-1-a | spherical roller | C | 25 | | | ○ | ○ | | | | ○ | | |
| | 4-1-a | spherical roller | D | 25 | | | ○ | ○ | | | | ○ | | |
| | 4-1-b | spherical roller | D | 40 | | | ○ | ○ | | | | ○ | | |
| | Ex. | | | | | | | | | | | | | |
| Tab. 2 FIG. 12 | 2-2-a | spherical roller | A | 25 | | | | | ○ | ○ | ○ | | D > A > C up to 100 hr | |
| FIG. 13b | 2-2-b | spherical roller | A | 40 | | | | | ○ | ○ | ○ | | | |
| | Comp. Ex. | | | | | | | | | | | | | |
| | 3-2-a | spherical roller | C | 25 | | | | | ○ | ○ | ○ | | A > C > D for 100 hr or longer | A ÷ C >> D |
| | 4-2-a | spherical roller | D | 25 | | | | | ○ | ○ | ○ | | | |
| | 4-2-b | spherical roller | C | 40 | | | | | ○ | ○ | ○ | | | |
| | Ex. | | | | | | | | | | | | | |
| Tab. 3 FIG. 16A | 3-1-a | cylindrical roller | A | 20 | | | ○ | ○ | | | | ○ | | A ÷ C >> D |
| | 3-1-b | cylindrical roller | A | 25 | | | ○ | ○ | | | | ○ | | |

TABLE 4-continued

| | | | | | TEST | | | | | | | | Evaluation | |
|---|---|---|---|---|---|---|---|---|---|---|---|---|---|---|
| | | | | | Deteriorating in air (170° C.) | | | | Deteriorating in oil (150° C.) | | | | Annular | |
| FIG./ Tab. | Ex- ample/ Comp. Ex. | Holder type | Matrix Mate- rial | GF % | Break- ing load | Break- ing elongn. | Weight loss | Assem- bling test | Break- ing load | Break- ing elongn. | Weight in- crease | Assem- bling test | tensile breaking elongn. | Weight change rate |
| | Ex. | | | | | | | | | | | | | |
| | Comp. Ex. | | | | | | | | | | | | | |
| | 5-1-a | cylin- drical roller | C | 25 | | | ○ | ○ | | | | ○ | | |
| | 6-1-a | cylin- drical roller | D | 20 | | | ○ | ○ | | | | ○ | | |
| | 6-1-b | clin- drical roller | D | 25 | | | ○ | ○ | | | | ○ | | |
| | Ex. | | | | | | | | | | | | | |
| Tab. 3 FIG. 15A FIG. 15B FIG. 16B | 3-2-a | cylin- drical roller | A | 20 | | | | | ○ | ○ | ○ | | D > A > C up to 100 hr | A ÷ C >> D |
| | 3-2-b | cylin- drical roller | A | 25 | | | | | ○ | ○ | ○ | | | |
| | Comp. Ex. | | | | | | | | | | | | | |
| | 5-2-a | cylin- drical roller | C | 25 | | | | | ○ | ○ | ○ | | A > C > D for 100 hr or longer | |
| | 6-2-a | cylin- drical roller | D | 20 | | | | | ○ | | ○ | | | |
| | 6-2-b | cylin- drical roller | D | 25 | | | | | ○ | ○ | ○ | | | |

Matrix material
A: Straight-chain PPS resin (Fortron KPS W214)
C: Branched PPS resin (Topren T4)
D: Thermally resistant nylon-6,6 (Ube Nylon 2020U)
o success
x failure As an example A, a holder for a crown bearing with 11 pockets and a pocket entrance diameter of 6.35 mmϕ was prepared with "Fortron KPS W 214" linear-chain PPS resin supplied by Kureha Chemical Industry Co., Ltd., using an injection molding machine Model IS-22P of Toshiba Machinery Co., Ltd. The holder was subjected to the thermal deterioration test and the deterioration test in oil.

The thermal deterioration test was conducted by standing the holder in an air-circulating oven at 190° C. for a desired period up to 450 hours. The deterioration test in oil was conducted by dipping the holder in Mobil gear oil SHC 629 (with SP type high pressure agents) and standing it in an air-circulating oven at 150° C. for a desired period up to 450 hours.

The holder after testing was subjected to measurement of the annular tensile breaking load and the annular tensile breaking elongation (based on internal diameter) as previously explained.

Figures 20A, 20B:
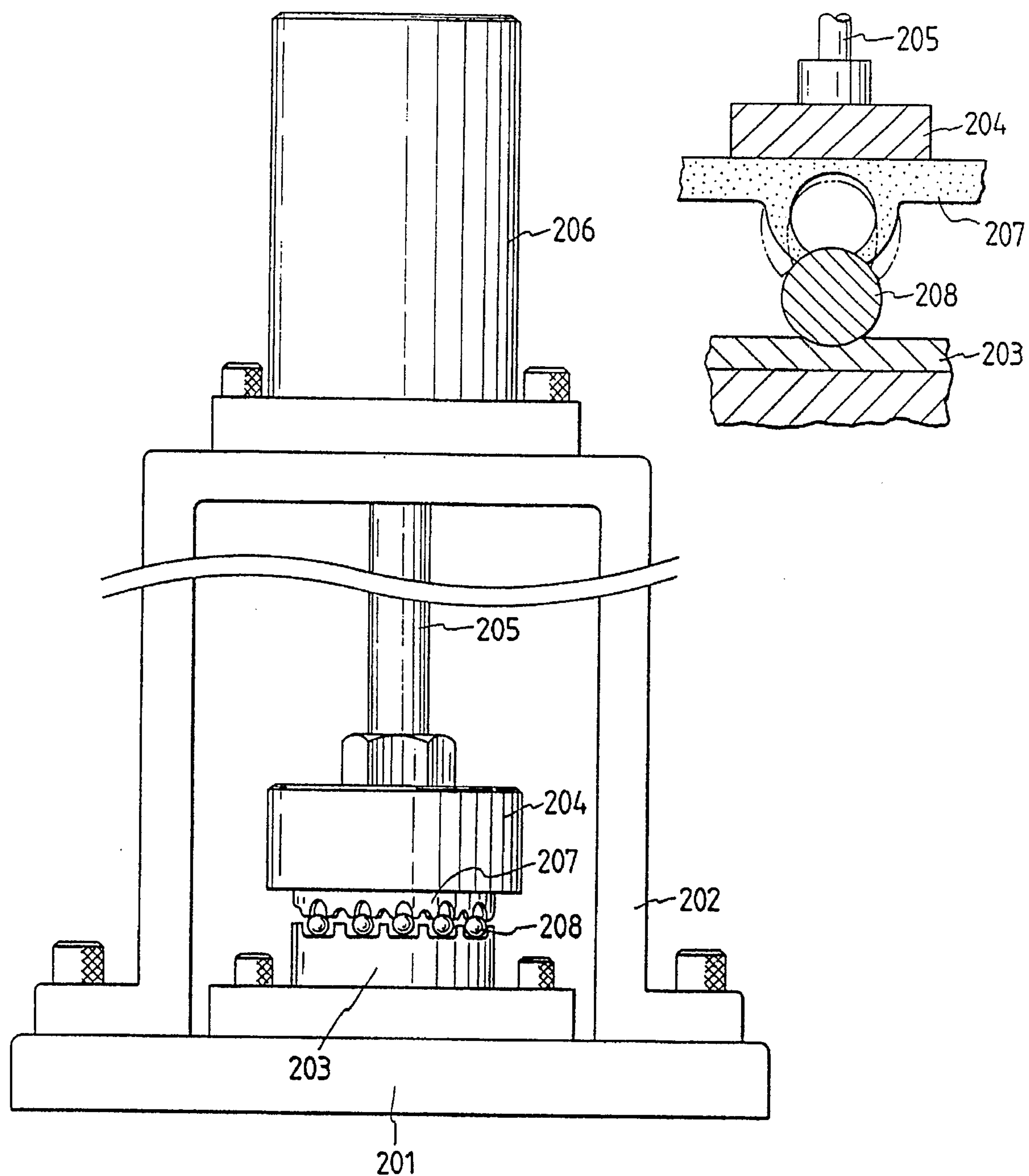
FIGS. 20A and 20B are views of an air-driven assembling apparatus employed in the assembling test.

Also, in order to evaluate the suitability for ball assembling, an assembling test was conducted with an air-driven automatic ball assembling apparatus of Nippon Seiko Kabushiki Kaisha, utilizing steel balls of 9/32" (normal balls) and of 5/16" (larger than normal size by one rank). As will be appreciated from FIGS. 20A and 20B, this apparatus is capable of simultaneously lodging all of the balls in the pockets of the holder, by placing the pocket entrances of the holder on the evenly distributed steel balls and pushing the bottom of said holder toward the balls with air pressure. In more detail, a frame 202 and a ball support member 203 are fixed on a base plate 201, and the holder test-specimen is supported, as shown in the drawings, on a punch 204 provided at the front end of a piston rod 205 extending from an air cylinder 206 which is fixed on the frame 202. Then the bottom of the holder is pressed, with the air pressure supplied to the cylinder 206, toward the steel balls 208 fixed on the ball support member 203, thus simultaneously pressing all the steel balls 208 into the pockets of the holder 207. The holder 207 holds the steel balls 208 in the pockets, with a deformation as indicated by broken lines in FIG. 20B.

In the ball assembling test, holders containing various amounts of glass fibers were examined.

As Comparative Examples C and D, holders were made of branched PPS resin "Tohpren (trade name) T4" and thermally resistant nylon-6,6 resin "Ube Nylon 2020U (trade name) with similar amounts of glass fibers.

The results of the ball assembling test are shown in Table 5.

TABLE 5

| | Ball Assembling Test | |
|---|---|---|
| | Percentage of success (%) | |
| | 9/32" (normal) balls | 5/16" balls |
| Example A | 100 | 100 |
| Com. Ex. C | 60 (fingers broken) | 0 (holder broken) |
| Com. Ex. D | 100 | 100 |

The holders made of linear-chain PPS resin provided, as did the holders of thermally resistant nylon-6,6 resin of the Comparative Example D, a success of 100% both with the normal 9/32" steel balls and the larger 5/16" balls. However, the holders of the Comparative Example C utilizing branched PPS resin showed a success of only 60% for the 9/32" steel balls, with breakage in the fingers of the holder, and they were completely unusable for assembling the 5/16" balls, with breaking and scattering of the holders.

Figure 21B:
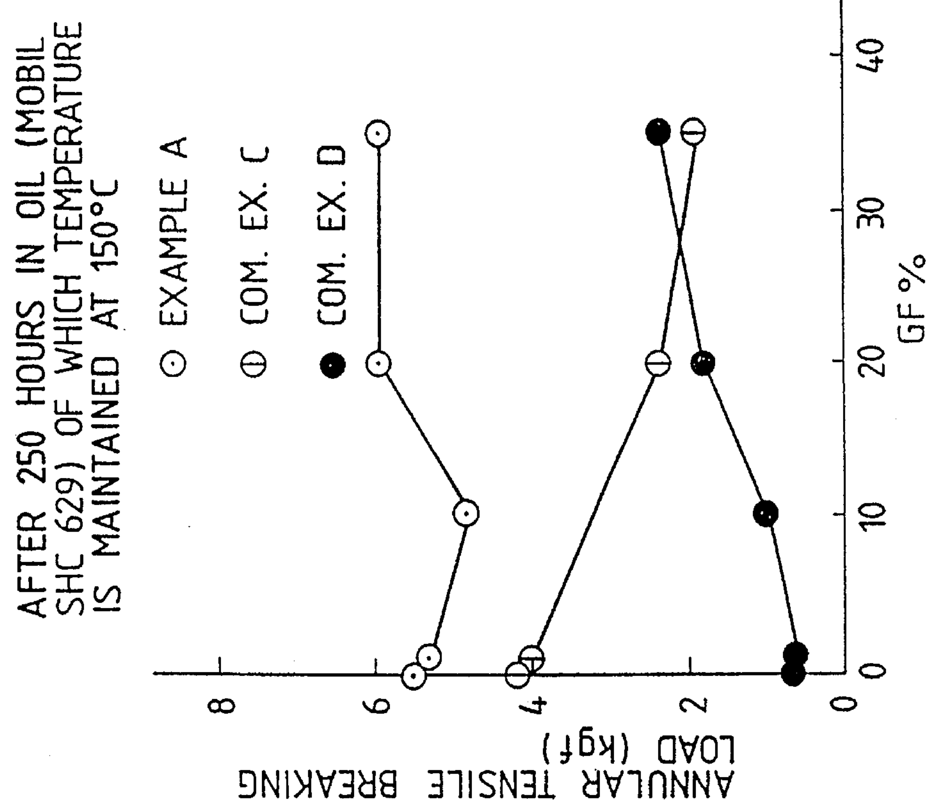
FIGS. 21A and 21B are charts showing the change in the annular tensile breaking load of a holder for a crown bearing, as a function of the amount of addition of glass fibers, after the lapse of 250 hours in air and in oil, respectively.
Figure 21A:
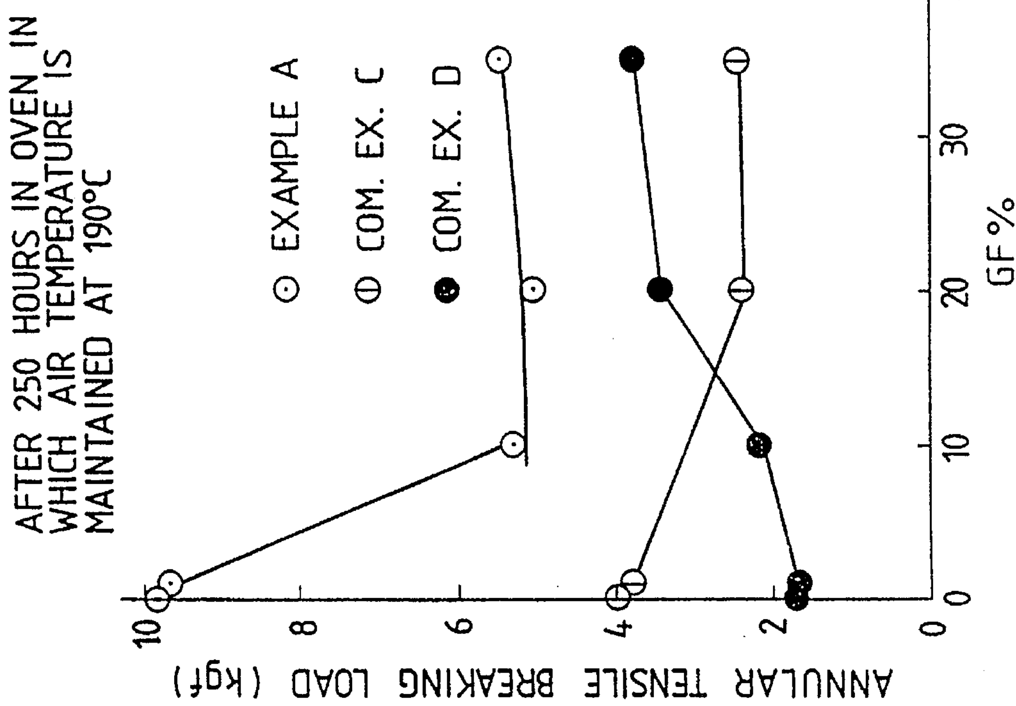

FIGS. 21A and 21B show the change in the annular tensile breaking load, as a function of the amount of addition of glass fibers, of a holder for a crown bearing after the lapse of 250 hours respectively in air and in oil. As shown in these charts, the breaking load of the Example A was lowered in air by the addition of glass fibers, but was always higher, in air and in oil, than that of the Comparative Examples C and D within a range of glass fiber addition of 0 to 5 wt. %.

Figure 22B:
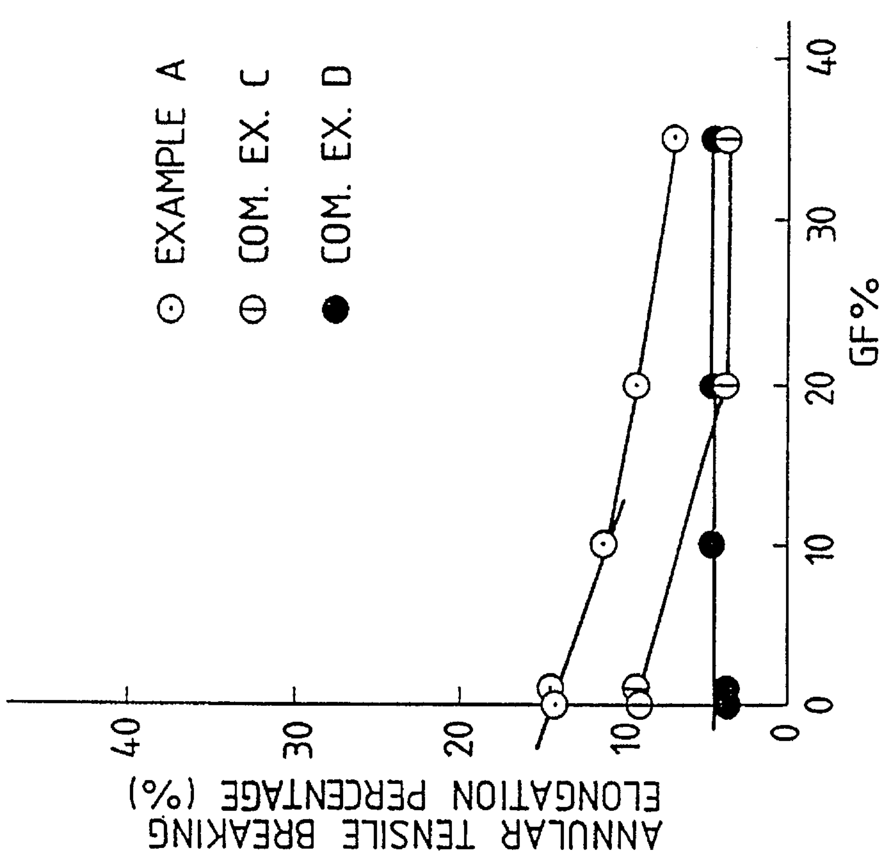
FIGS. 22A and 22B are charts showing the change in the annular tensile breaking elongation of a holder for a crown bearing, as a function of the amount of addition of glass fibers, after the lapse of 250 hours in air and in oil, respectively.
Figure 22A:
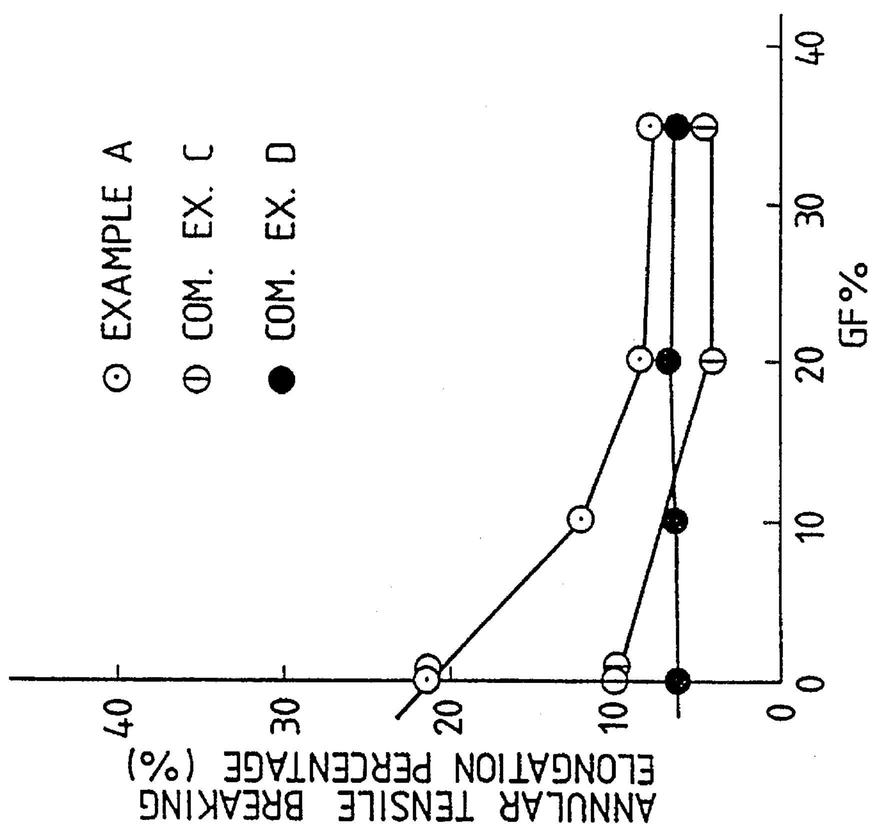

FIGS. 22A and 22B show the change in the annular tensile breaking elongation, as a function of the amount of addition of glass fibers, of a holder for a crown bearing after the lapse of 250 hours respectively in air and in oil. As shown in these charts, Example A showed a decrease in the breaking elongation with increasing amounts of glass fibers, both in air and in oil, but always displayed higher breaking elongation than Comparative Examples C and D within a range of glass fiber addition of 0 to 35 wt. %.

Figure 23A:
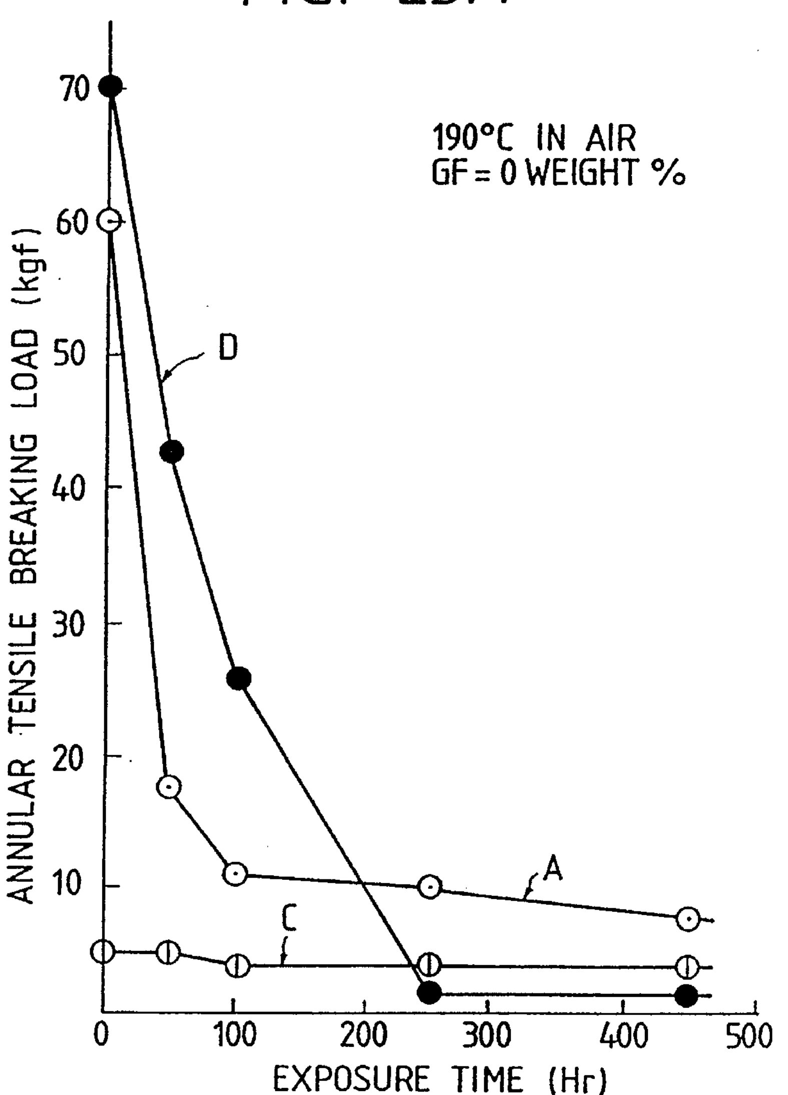
FIGS. 23A and 23B are charts showing the time-dependent change in the annular tensile breaking load of a holder for a crown bearing, without glass fiber addition, left standing in air and in oil, respectively.
Figure 23B:
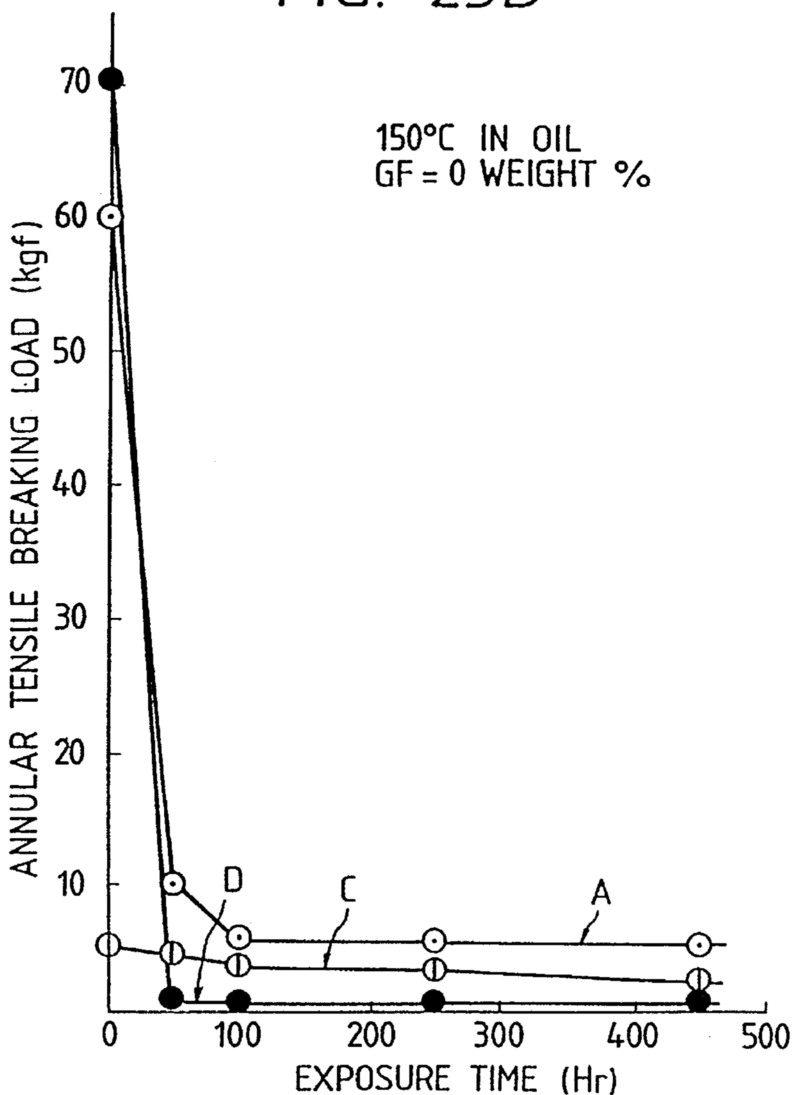

FIGS. 23A and 23B show the time-dependent change in the annular tensile breaking load of a holder for a crown bearing, without addition of glass fibers. As shown in these charts, the Comparative Example C scarcely showed time-dependent change, while the Example A and the Comparative Example D showed significant decrease in the breaking load during the initial stages of deterioration. However, the breaking load of the Example A was higher after prolonged standing, both in air and in oil.

Figure 24B:
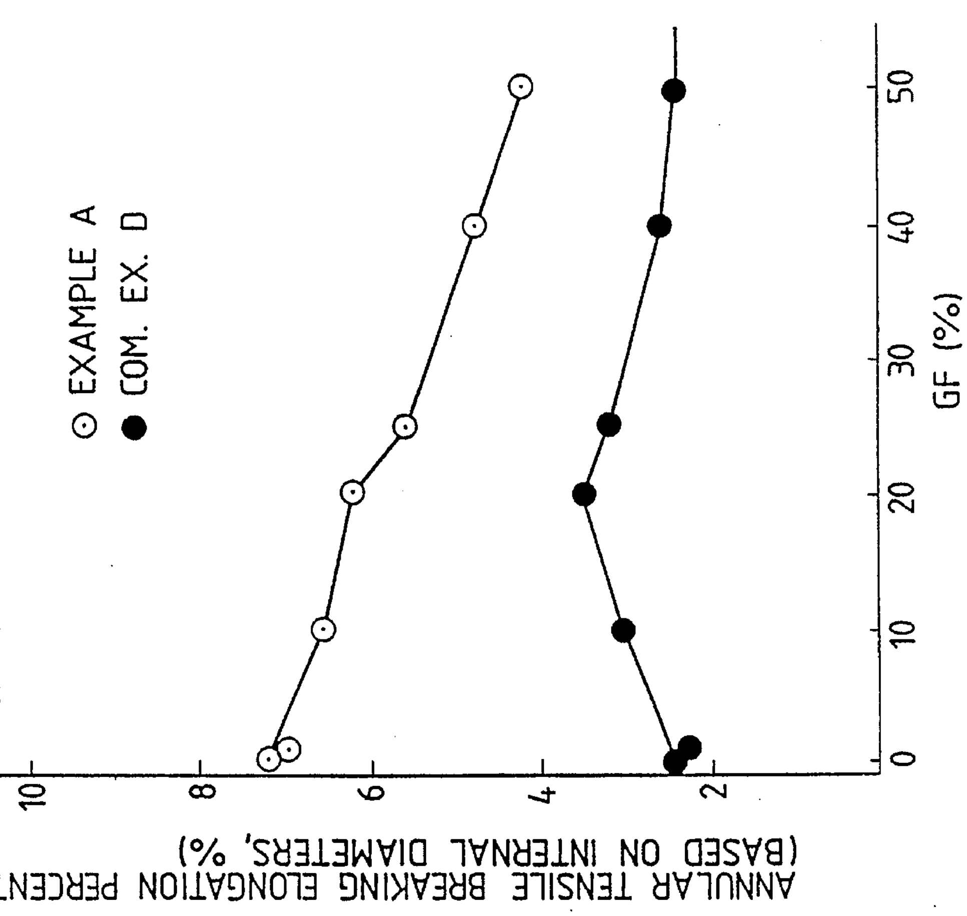
FIGS. 24A and 24B are charts showing the changes respectively in the annular tensile breaking load and in the annular tensile breaking elongation of a holder for a cylindrical roller bearing, as a function of the amount of addition of glass fibers, after deterioration in oil (150° C.)
Figure 24A:
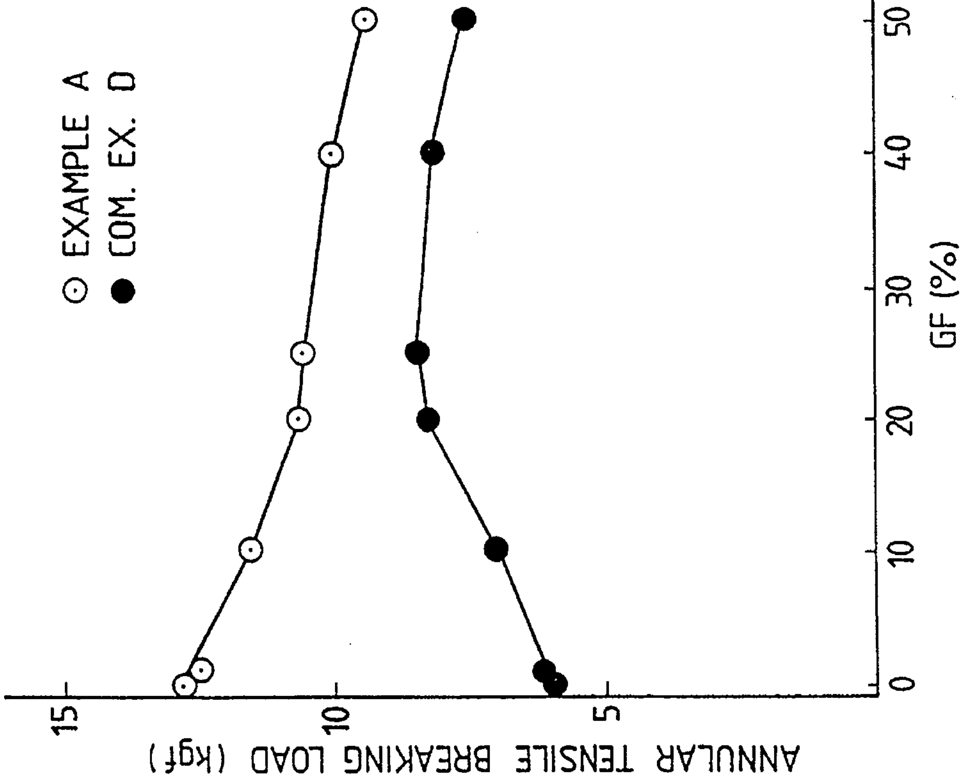

FIGS. 24A and 24B show the changes respectively in the annular tensile breaking load and in the annular tensile breaking elongation, as a function of the amount of addition of glass fibers, for a holder of a cylindrical roller bearing, deteriorated in oil (150° C.). As shown in these charts, the breaking load and breaking elongation decreased with increases in the amount of glass fibers. Comparative Example D showed little change in the breaking load and in the breaking elongation, with respect to the amount of added glass fibers. However, Example A displayed breaking load and breaking elongation always higher than those of Comparative Example D within a range of the amount of glass fibers from 0 to 50 wt. %.

Figure 25B:
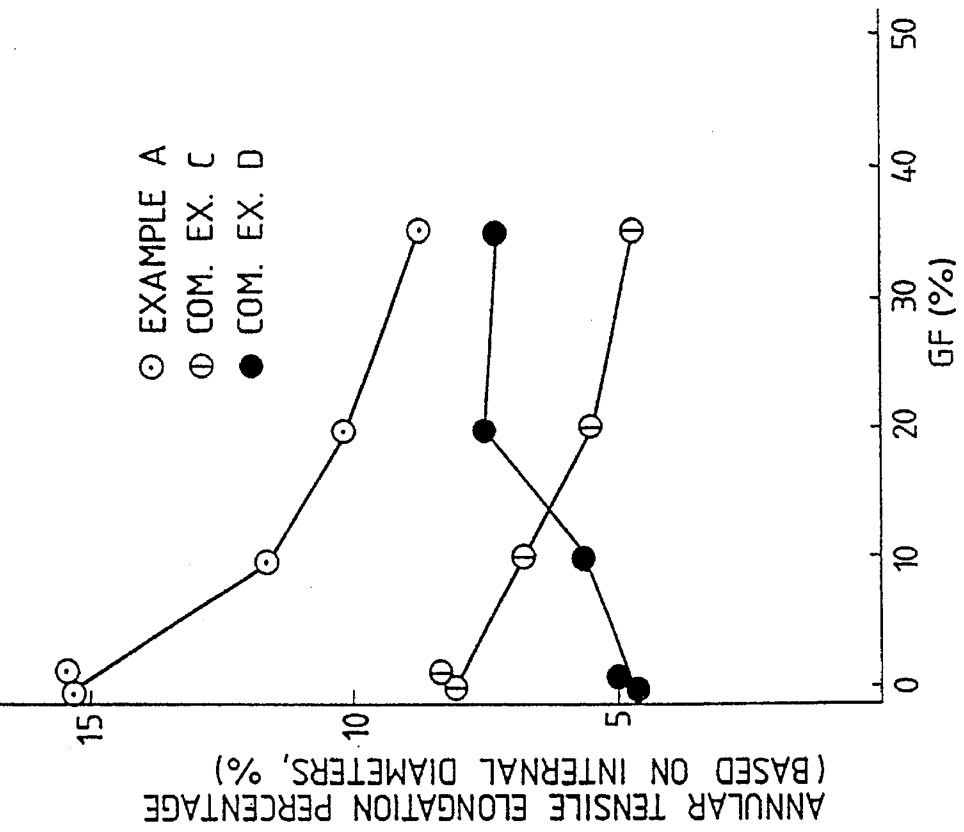
FIGS. 25A and 25B are charts showing the changes respectively in the annular tensile breaking load and in the annular tensile breaking elongation of a holder for a conical roller bearing, as a function of the amount of addition of glass fibers, after deterioration in oil (150° C.)
Figure 25A:
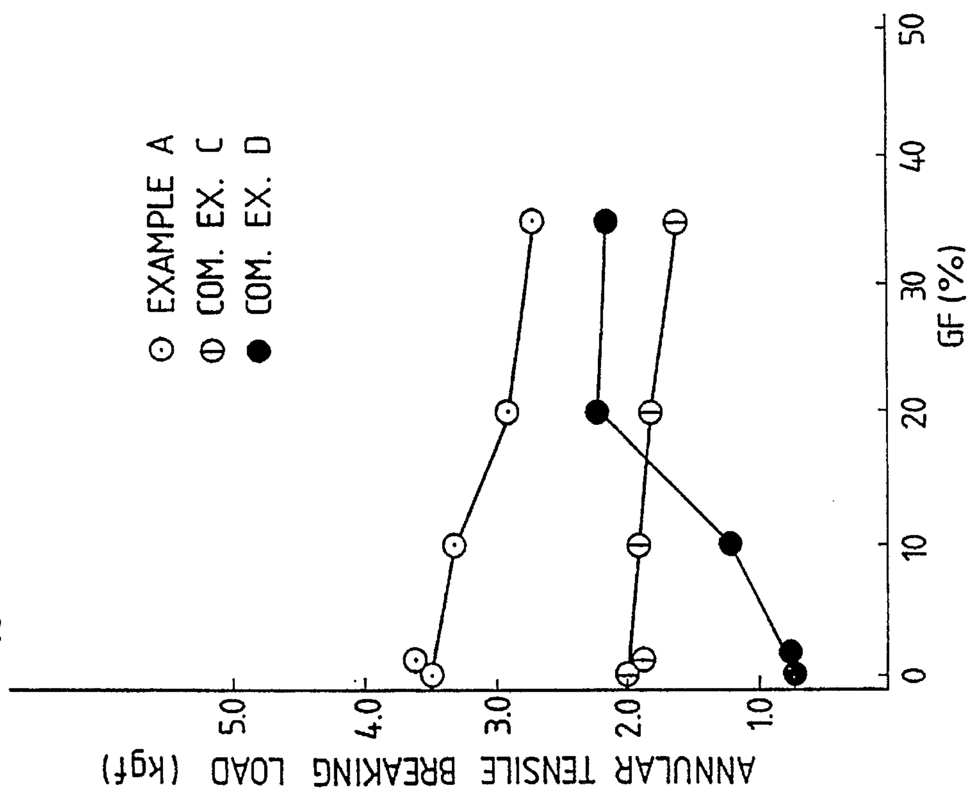

FIGS. 25A and 25B show changes in the annular tensile breaking load and in the annular tensile breaking elongation, as a function of the amount of addition of glass fibers, for a holder of a conical roller bearing, deteriorated in oil (150° C.). As shown in these charts, the breaking load and breaking elongation of Example A decreased with increases in the amount of glass fibers. In Comparative Example C, these values decreased slightly with increases in the amount of glass fibers. In Comparative Example D, these values tended to increase with increases in the amount of glass fibers. However, the values for Example A were always higher than those for Comparative Examples C and D, in a range of the amount of addition of glass fibers from 0 to 35 wt. %.

Figure 26:
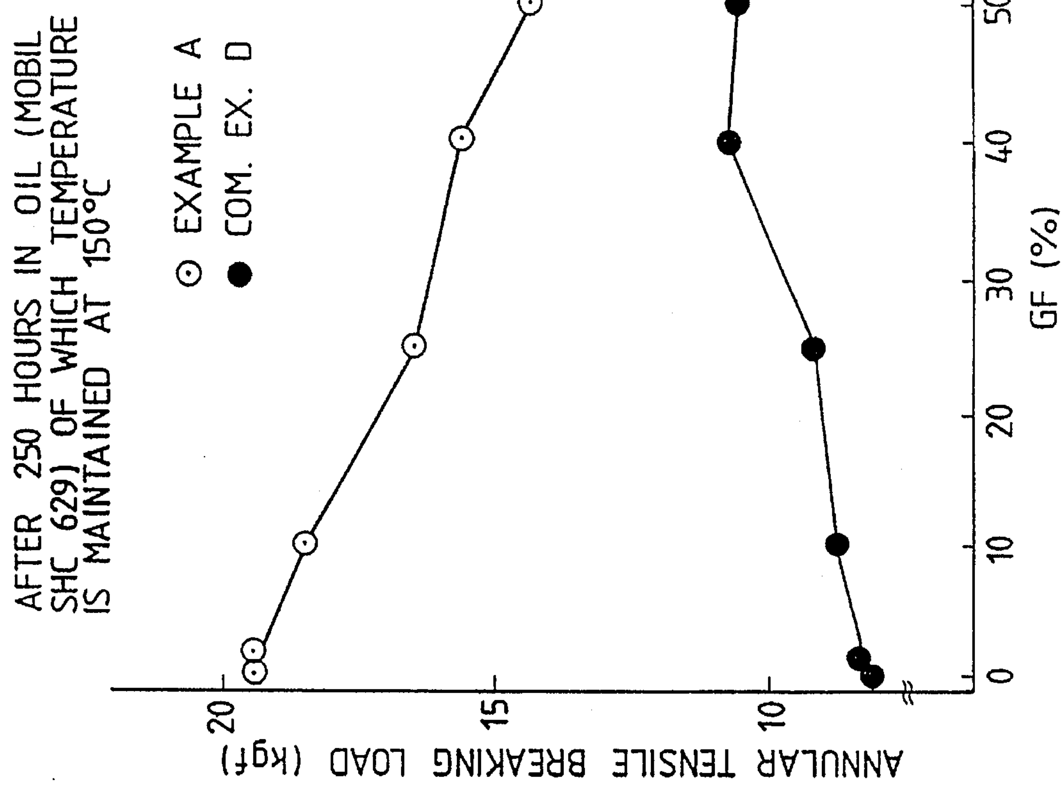
FIG. 26 is a chart showing the change in the annular tensile breaking load of a holder for a spherical roller bearing, as a function of the amount of addition of glass fibers, after deterioration in oil (150° C.)

FIG. 26 shows the change in the annular tensile breaking load, as a function of the amount of addition of glass fibers, for a holder of a spherical roller bearing, deteriorated in oil (150° C.). As shown in this chart, the breaking load of Example A decreased with increases in the amount of glass fibers, while that of Comparative Example D tended to increase with increases in the amount of glass fibers. However, the values for Example A were always higher than those for Comparative Example D, in a range of the amount of glass fibers from 0 to 50 wt. %.

FIGS. 27 to 30 show the percentage of success of ball assembling in various holders at room temperature as a function of the amount of addition of glass fibers. A percentage of success at least equal to 70% is considered practically acceptable.

Figure 27:
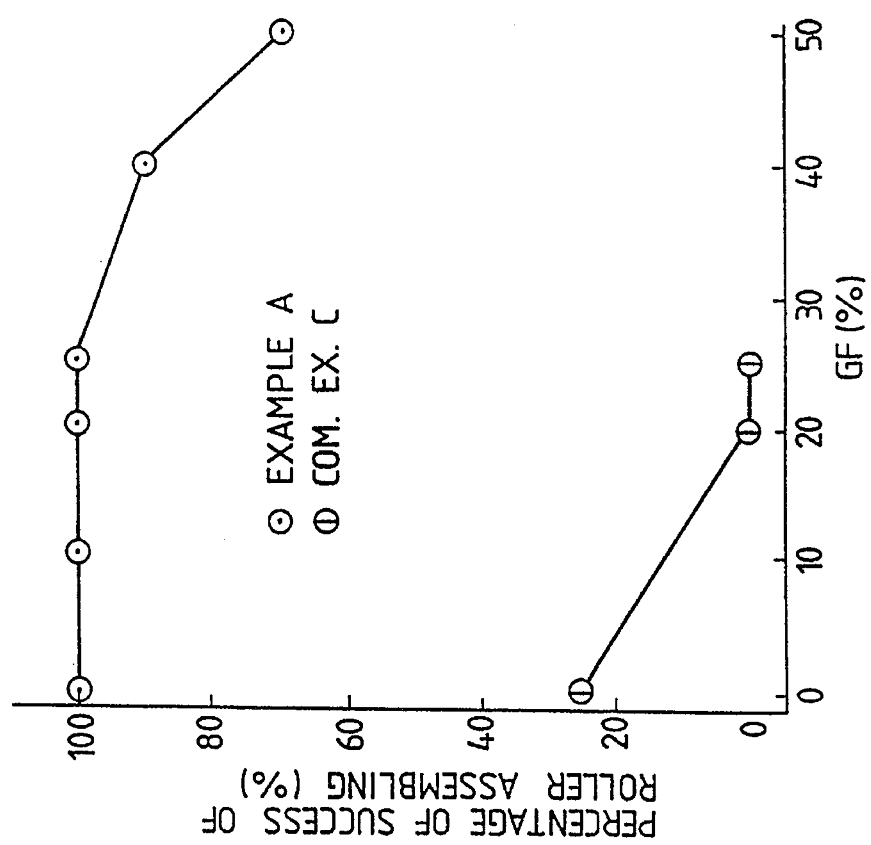

FIG. 27 shows the results of tests on a holder for a cylindrical roller bearing. Example A displayed a percentage of success of 100% with the amount of addition of glass fibers up to 25 wt. %, and the percentage decreased to 70% with the amount of addition of 50 wt. %. On the other hand, the percentage of success for Comparative Example C was 25% for an addition of 0%, and was 0% for an addition of glass fibers of 20 wt. %.

Figure 28:
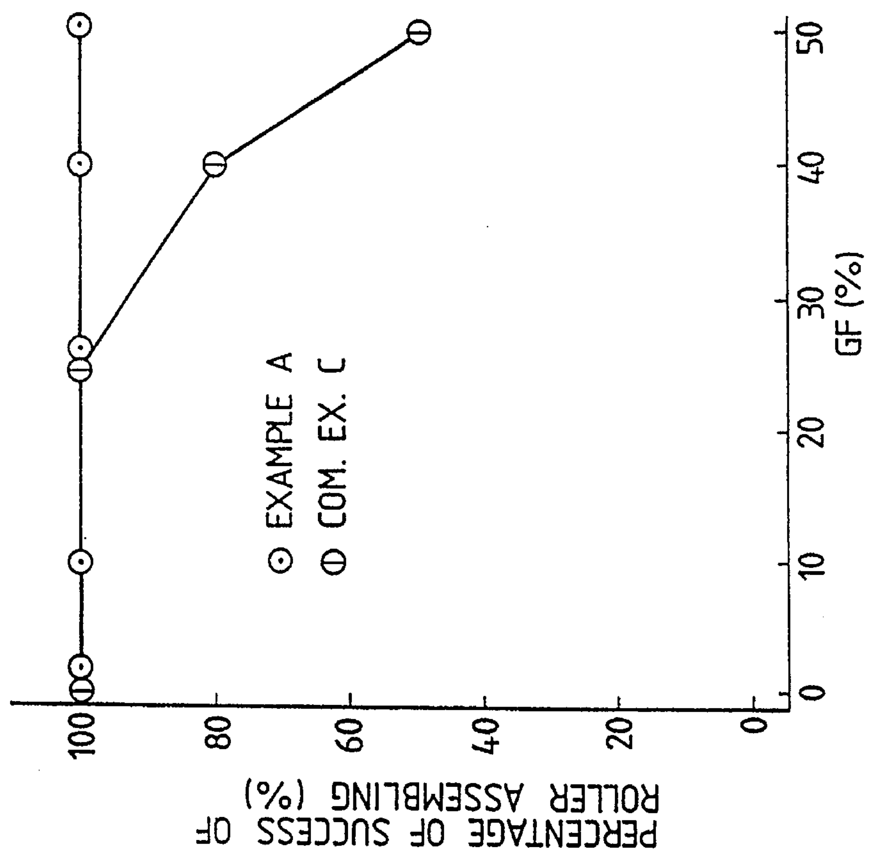

FIG. 28 shows the results of tests on a holder for a spherical roller bearing, wherein the percentage of success was 100% in a range of the amount of glass fiber addition from 0 to 50 wt. %. On the other hand, the success rate for Comparative Example C was 100% in a range of the amount of addition of glass fibers up to 25 wt. %, but decreased to 50% at the amount of addition of 50 wt. %.

Figure 29:
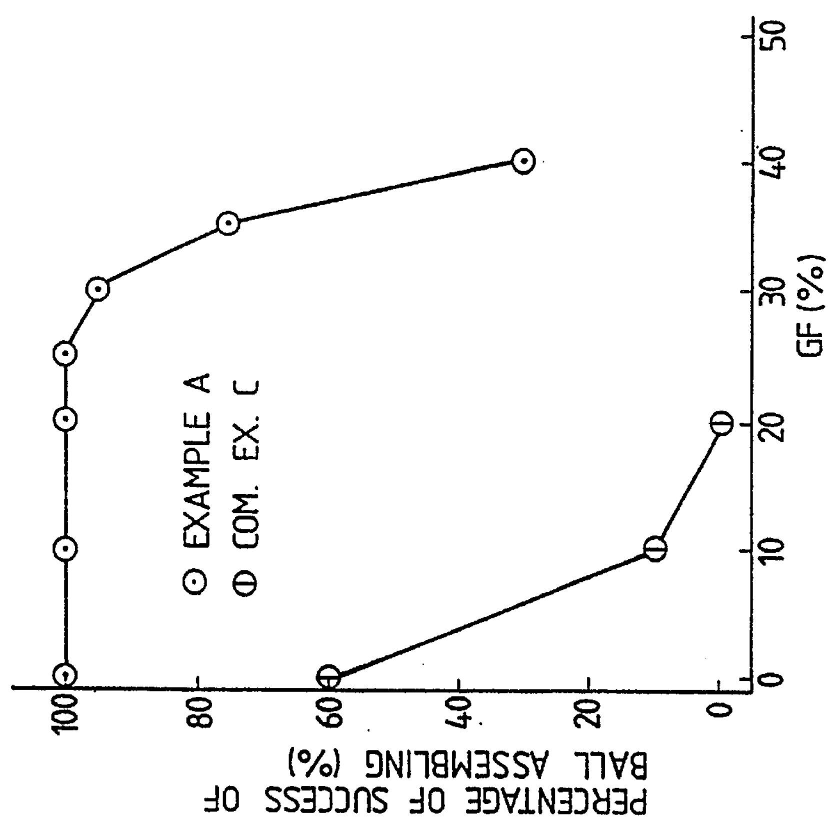

FIG. 29 shows the results of tests on a holder for a crown ball bearing, wherein the percentage of success for Example A was 100% in a range of the amount of glass fiber addition up to 25 wt % but decreased to 75% and 30% respectively at the amounts of addition of glass fibers of 35 and 50 wt. %. On the other hand, the percentage of success for Comparative Example C was 60% at the amount of addition of glass fibers of 0%, but was 0% at the addition of 20 wt. %.

Figure 30:
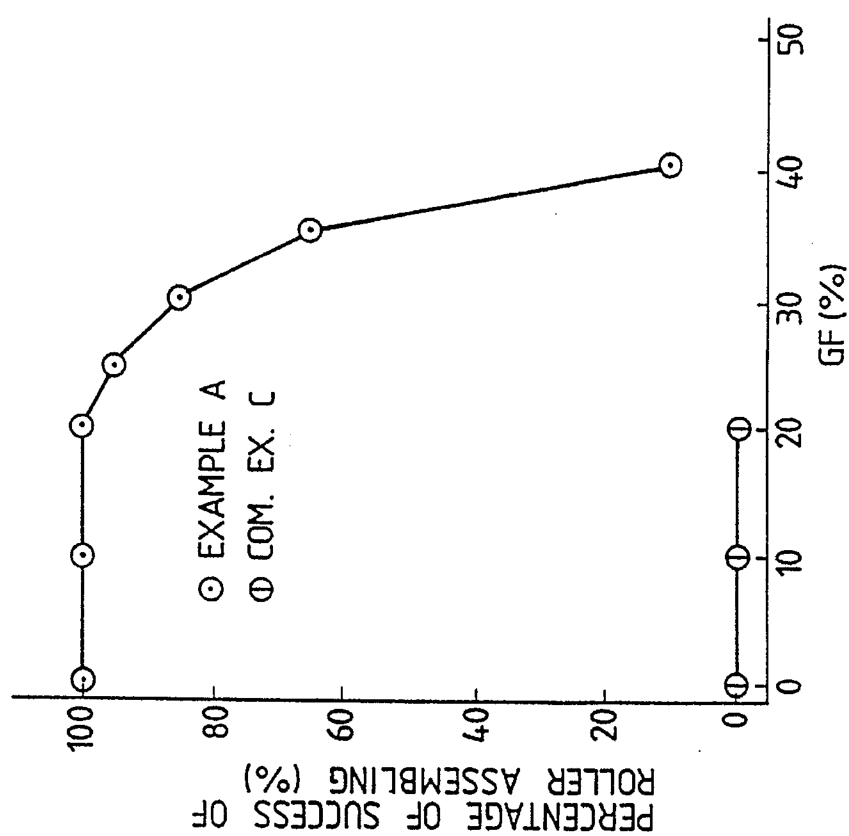

FIG. 30 shows the results of tests on a holder for a conical roller bearing, wherein the percentage of success for Example A was 100% for the amount of addition up to 20 wt. %, but decreased to 85 and 10% respectively at amounts of addition of 30 and 50 wt. %. On the other hand, the percentage of success for Comparative Example C was 0% regardless of the amount of addition of glass fibers.

The above-explained results are summarized in Table 6.

TABLE 6

| | | | | | TEST | | | | | | Evaluation |
|---|---|---|---|---|---|---|---|---|---|---|---|
| | | | | | Deteriorating in air (170° C.) | | | Deteriorating in oil (150° C.) | | | Evaluation |
| FIG./Tab. | Example/ Comp. Ex. | Holder type | Matrix Material | GF % | Breaking load | Breaking elongn. | Assembling test | Breaking load | Breaking elongn. | Assembling test | Annular tensile breaking elongn. |
| | Ex. | CROWN ball | A | 0 | ○ | ○ | ○ | ○ | ○ | ○ | A > C ÷ D |
| | Ex. | CROWN ball | A | 1 | ○ | ○ | ○ | ○ | ○ | | |
| | Ex. | CROWN ball | A | 10 | ○ | ○ | | ○ | ○ | ○ | |
| | Ex. | CROWN ball | A | 20 | ○ | ○ | ○ | ○ | ○○ | | |
| FIG. 21A | Ex. | CROWN ball | A | 25 | | | ○ | | | ○ | |
| | Ex. | CROWN ball | A | 30 | | | ○ | | | ○ | |
| FIG. 21B | Ex. | CROWN ball | A | 35 | ○ | ○ | ○ | ○ | ○ | ○ | |
| | Ex. | CROWN ball | A | 40 | | | ○ | | | x | |
| FIG. 22A | Comp. | CROWN ball | C | 0 | ○ | ○ | ○ | ○ | ○ | x | |
| FIG. 22B | Comp. | CROWN ball | C | 1 | ○ | ○ | | ○ | ○ | | |
| FIG. 23A | Comp. | CROWN ball | C | 10 | ○ | ○ | ○ | ○ | ○ | x | |
| FIG. 23B | Comp. | CROWN ball | C | 20 | ○ | ○ | ○ | ○ | ○ | x | |
| FIG. 29 | Comp. | CROWN ball | C | 35 | ○ | ○ | | ○ | ○ | | |
| | Comp. | CROWN ball | D | 0 | ○ | ○ | | ○ | ○ | | |
| | Comp. | CROWN ball | D | 1 | ○ | ○ | | ○ | ○ | | |
| | Comp. | CROWN ball | D | 10 | ○ | ○ | | ○ | ○ | | |
| | Comp. | CROWN ball | D | 20 | ○ | ○ | | ○ | ○ | | |
| | Comp. | CROWN ball | D | 35 | ○ | ○ | | ○ | ○ | | |
| | Ex. | cylindrical roller | A | 0 | | | ○ | ○ | ○ | ○ | A > D |
| | Ex. | cylindrical roller | A | 1 | | | | ○ | ○ | | |
| | Ex. | cylindrical roller | A | 10 | | | ○ | ○ | ○ | ○ | |
| | Ex. | cylindrical roller | A | 20 | | | ○ | ○ | ○ | ○ | |
| | Ex. | cylindrical roller | A | 25 | | | ○ | | | | |
| | | cylindrical roller | A | 30 | | | | ○ | ○ | | |
| FIG. 24A | Ex. | cylindrical roller | A | 40 | | | ○ | ○ | ○ | ○ | |
| FIG. 24B | Ex. | cylindrical roller | A | 50 | | | ○ | ○ | ○ | ○ | |
| FIG. 27 | Comp. | cylindrical roller | C | 0 | | | ○ | | | x | |
| | Comp. | cylindrical roller | C | 20 | | | ○ | | | x | |
| | Comp. | cylindrical roller | C | 25 | | | ○ | | | x | |
| | Comp. | cylindrical roller | D | 0 | | | | ○ | ○ | | |
| | Comp. | cylindrical roller | D | 1 | | | | ○ | ○ | | |
| | Comp. | cylindrical roller | D | 10 | | | | ○ | ○ | | |
| | Comp. | cylindrical roller | D | 20 | | | | ○ | ○ | | |
| | Comp. | cylindrical roller | D | 30 | | | | ○ | ○ | | |
| | Comp. | cylindri- | D | 40 | | | | ○ | ○ | | |

TABLE 6-continued

| | | | | | | | | | |
|---|---|---|---|---|---|---|---|---|---|
| | | cal roller | | | | | | | |
| | Comp. | cylindri-cal roller | D | 50 | | o | o | | |
| | EX. | conical roller | A | 0 | o | o | o | o | |
| | EX. | conical roller | A | 1 | | o | o | | |
| | EX. | conical roller | A | 10 | o | o | o | o | |
| | EX. | conical roller | A | 20 | o | o | o | o | |
| | EX. | conical roller | A | 25 | o | | | o | |
| | EX. | conical roller | A | 30 | o | | | o | |
| FIG. 25A | EX. | conical roller | A | 35 | o | o | o | x | |
| | EX. | conical roller | A | 40 | o | | | x | |
| FIG. 25B | Comp. | conical roller | C | 0 | o | o | o | x | |
| | Comp. | conical roller | C | 1 | | o | o | | A > C = D |
| | Comp. | conical roller | C | 10 | o | o | o | x | |
| | Comp. | conical roller | C | 20 | o | o | o | x | |
| | Comp. | conical roller | C | 35 | | o | o | | |
| | Comp. | conical roller | D | 0 | | o | o | | |
| | Comp. | conical roller | D | 1 | | o | o | | |
| | Comp. | conical roller | D | 10 | | o | o | | |
| | Comp. | conical roller | D | 20 | | o | o | | |
| | Comp. | conical roller | D | 35 | | o | o | | |
| | Ex. | spherical roller | A | 0 | o | o | | o | |
| | Ex. | spherical roller | A | 1 | | o | | | |
| | Ex. | spherical roller | A | 10 | o | o | | o | |
| | Ex. | spherical roller | A | 25 | o | o | | o | |
| | Ex. | spherical roller | A | 40 | o | o | | o | |
| FIG. 26 | Ex. | spherical roller | A | 50 | o | o | | o | A > D |
| FIG. 28 | Comp. | spherical roller | C | 0 | o | | | o | |
| | Comp. | spherical roller | C | 20 | o | | | o | |
| | Comp. | spherical roller | C | 40 | o | | | o | |
| | Comp. | spherical roller | C | 50 | o | | | o | |
| | Comp. | spherical roller | D | 0 | | o | | | |
| | Comp. | spherical roller | D | 1 | | o | | | |
| | Comp. | spherical roller | D | 10 | | o | | | |
| | Comp. | spherical roller | D | 25 | | o | | | |
| | Comp. | spherical roller | D | 40 | | o | | | |
| | Comp. | spherical | D | 50 | | o | | | |

Matrix material

A: Linear chain PPS resin (Fortron KPS W214)
C: Branched PPS resin (Tohpren T4)
D: Thermally resistant nylon-6,6 (Ube Nylon 2020U)

o success } ↑
x failure

We claim:

1. A plastic retainer for rolling elements, which is made from a linear-chain polyphenylene sulfide resin composition comprising linear-chain polyphenylene sulfide resin having a fused viscosity, which is used as an index of molecular weight, of at least 700 poise when measured at 310° C. with a shearing rate of 200 $sec^{-1}$, and glass fibers in an amount of 0 to 45 weight %.

2. A plastic retainer according to claim 1, and which is configured for use in one of a conical roller bearing and a crown ball bearing, wherein the amount of glass fibers in said composition is from 10 to 30 weight %.

3. A plastic retainer according to claim 2, wherein the glass fibers are short fibers having an average fiber length 1 to 0.2 mm and an average fiber diameter of 20 to 5 μm.

4. A plastic retainer according to claim 1, and which is configured for use in one of a spherical roller bearing, a cylindrical roller bearing, a needle bearing, a roller clutch, and a ball bearing, wherein the amount of glass fibers in said composition is from 10 to 45 weight %.

5. A plastic retainer according to claim 4, wherein the glass fibers are short fibers having an average fiber length of 1 to 0.2 mm and an average fiber diameter of 20 to 5 μm.

* * * * *